United States Patent
Lee

(10) Patent No.: US 9,130,901 B2
(45) Date of Patent: Sep. 8, 2015

(54) PERIPHERAL FIREWALL SYSTEM FOR APPLICATION PROTECTION IN CLOUD COMPUTING ENVIRONMENTS

(71) Applicant: Zentera Systems, Inc., San Jose, CA (US)

(72) Inventor: Jaushin Lee, Saratoga, CA (US)

(73) Assignee: Zentera Systems, Inc., San Jose, CA (US)

( * ) Notice: Subject to any disclaimer, the term of this patent is extended or adjusted under 35 U.S.C. 154(b) by 9 days.

(21) Appl. No.: 14/190,019

(22) Filed: Feb. 25, 2014

(65) Prior Publication Data

US 2014/0245423 A1  Aug. 28, 2014

Related U.S. Application Data

(60) Provisional application No. 61/769,713, filed on Feb. 26, 2013.

(51) Int. Cl.
  *H04L 29/06* (2006.01)

(52) U.S. Cl.
  CPC ........ *H04L 63/0218* (2013.01); *H04L 63/0263* (2013.01)

(58) Field of Classification Search
  CPC ........................ H04L 63/0218; H04L 63/0263
  USPC ............................................................ 726/12
  See application file for complete search history.

(56) References Cited

U.S. PATENT DOCUMENTS

| | | | |
|---|---|---|---|
| 8,250,642 B2 * | 8/2012 | Bartholomy et al. | 726/11 |
| 8,640,218 B2 * | 1/2014 | Bartholomy et al. | 726/11 |
| 2005/0257264 A1 * | 11/2005 | Stolfo et al. | 726/23 |
| 2006/0031472 A1 * | 2/2006 | Rajavelu et al. | 709/224 |
| 2008/0276313 A1 * | 11/2008 | Kummu et al. | 726/22 |
| 2012/0005724 A1 | 1/2012 | Lee | |
| 2014/0068698 A1 * | 3/2014 | Burchfield et al. | 726/1 |
| 2014/0068701 A1 * | 3/2014 | Burchfield et al. | 726/1 |

FOREIGN PATENT DOCUMENTS

WO  WO 2012130523 A1 * 10/2012 ............. H04L 29/06

* cited by examiner

*Primary Examiner* — Michael S McNally
(74) *Attorney, Agent, or Firm* — Staniford Tomita LLP

(57) ABSTRACT

User input including an application profile is received. The profile specifies a first server group, a second server group, and computing flows between the first and second server groups. User input identifying at least the first server group to include in a cloud chamber is received. Internet Protocol (IP) addresses assigned to virtual machines provisioned into the first and second server groups are obtained. Based on the computing flows specified in the application profile and the IP addresses assigned to the virtual machines, a set of firewall rules are generated for each virtual machine in the cloud chamber.

20 Claims, 10 Drawing Sheets

PERIPHERAL FIREWALL SYSTEM FOR APPLICATION PROTECTION IN CLOUD COMPUTING ENVIRONMENTS

CROSS-REFERENCE TO RELATED APPLICATIONS

This patent application claims priority to U.S. provisional patent application 61/769,713, filed Feb. 26, 2013, which is incorporated by reference along with all other references cited in this application.

BACKGROUND

The present invention relates to the field of information technology, including, more particularly, to systems and techniques for distributed firewalls in cloud computing environments.

A traditional firewall system in enterprise network environments typically utilizes network topology information and is deployed at the peripheral of a TCP/IP network domain to protect applications and computers behind the network. When any software application or computer that is outside of the network domain attempts to communicate with another application or computer that is inside the network domain, the traffic has to pass the firewall. Depending on the security policy programmed on this firewall, the communication traffic may or may not be approved to traverse through.

However, if both applications and computers are behind the network, their communications may not travel through the peripheral of the network. Therefore, their communications will not pass through the firewall due to the network topology and their communications will be allowed. This is a fundamental concept for a peripheral network based firewall deployment in an enterprise environment. This network based firewall is typically implemented with a centralized architecture, where a single firewall is provisioned on the edge of a network to protect a number of computers behind the firewall.

When enterprises start to deploy their applications or virtual servers in a cloud computing environment, private or public, the deployment for a peripheral firewall becomes very challenging because the network is virtualized and the physical topology information is not available to the users of the cloud computing environment due to business model and liability reasons. Brute forced methods to obtain this information and provide it for firewall deployment cannot be effectively utilized by most cloud management systems. For example, in a public cloud, by definition all virtual machines and applications are "exposed" on the Internet.

Enterprise customers typically cannot obtain the network topology information from the cloud service providers since the same topology may be used for deploying computing resources for other customers as well. Further, even if this information is made available to enterprise customers for firewall deployment purpose, the cloud management system may not follow the physical network topology for virtual machine instantiation. The cloud orchestration system will typically control the virtual network topology in a modern design. As a result, the applications and firewall protection may be out of sync, as a conventional firewall typically works in the physical network. A cloud management system deploys virtual machines in a distributed computing environment. Handling a centralized firewall on a per customer basis to address distributed virtual machines can be technically challenging.

Therefore, there is a need for a new peripheral firewall system, provisioned and controlled by enterprise customers, that applies in a virtual domain to protect the applications and virtual machines in a cloud computing environment without using the underlying TCP/IP network topology or the network equipment. This peripheral firewall system needs to work seamlessly with the cloud orchestration system for the automation of the cloud. The security rules for the firewall system need to be statically specified by the customers, and then the firewall rules need to be dynamically computed and enforced, reacting to the dynamic reconfiguring of the computing resources driven by the cloud orchestration system. There is a need to allow enterprises to follow their conventional concept for a "peripheral firewall" and easily protect the applications and virtual machines in the new cloud computing environments, while ensuring that the technology naturally fits into a new and distributed cloud computing environment.

BRIEF SUMMARY OF THE INVENTION

User input including an application profile is received. The profile specifies a first server group, a second server group, and computing flows between the first and second server groups. User input identifying at least the first server group to include in a cloud chamber is received. Internet Protocol (IP) addresses assigned to virtual machines provisioned into the first and second server groups are obtained. Based on the computing flows specified in the application profile and the IP addresses assigned to the virtual machines, a set of firewall rules are generated for each virtual machine in the cloud chamber.

In a specific implementation, a method includes receiving user input including an application profile for deployment of an application in a cloud-computing environment, the application profile specifying a first server group, a second server group, and a computing flow between the first and second server groups, receiving user input identifying at least one of the first or second server groups to include in a cloud chamber, obtaining Internet Protocol (IP) addresses assigned to virtual machines provisioned into the first and second server groups, based on the computing flow specified in the application profile and the IP addresses assigned to the virtual machines, generating a set of firewall rules for each virtual machine in the at least one first or second server groups included in the cloud chamber, and distributing the firewall rules to each virtual machine in the at least one first or second server groups included in the cloud chamber.

A first firewall rule distributed to a virtual machine in the cloud chamber may include an IP address assigned to another virtual machine to indicate that the virtual machine is allowed to receive communications from the other virtual machine. A first firewall rule distributed to a virtual machine in the cloud chamber may include an IP address assigned to another virtual machine to indicate that the virtual machine is allowed to send communications to the other virtual machine.

In a specific implementation, the method further includes where the first server group is included in the cloud chamber, the second server group is not included in the cloud chamber, and the method includes not generating the firewall rules for the virtual machines of the second server group not included in the cloud chamber.

In a specific implementation, the generating a set of firewall rules includes examining the computing flow specified in the application profile, determining from the examination that the virtual machines provisioned into the first server group send data to the virtual machines provisioned into the second server group, obtaining an IP address assigned to a virtual machine provisioned into the second server group, and generating a first firewall rule for each virtual machine in the at least one first or second server groups included in the cloud chamber. The first firewall rule includes the IP address assigned to the virtual machine provisioned into the second server group to allow the virtual machines in the cloud chamber to send data to the virtual machine provisioned into the second server group.

In another specific implementation, the generating a plurality of firewall rules includes examining the computing flow specified in the application profile, determining from the examination that the virtual machines provisioned into the first server group receive data from the virtual machines provisioned into the second server group, receiving from an agent installed on a virtual machine in the second server group a message including an IP address assigned to the virtual machine in the second server group, and generating a first firewall rule for each virtual machine in the at least one first or second server groups included in the cloud chamber. The first firewall rule includes the IP address assigned to the virtual machine provisioned into the second server group to allow the virtual machines in the cloud chamber to receive data from the virtual machine provisioned into the second server group. In a specific implementation, the generating a set of firewall rules is after the obtaining IP addresses.

In another specific implementation, a method includes receiving information about an application for deployment of the application in a cloud-computing environment, the information specifying a first server group, a second server group, and a computing flow between the first and second server groups, receiving a selection of at least the first server group to include in a cloud chamber, obtaining Internet Protocol (IP) addresses assigned to virtual machines that have been provisioned into the first and second server groups, based on the computing flow and the IP addresses assigned to the virtual machines, generating a set of firewall rules for each virtual machine in the first server group included in the cloud chamber, and, transmitting the firewall rules to each virtual machine in the first server group included in the cloud chamber.

In a specific implementation, when receiving the information, no virtual machines have been provisioned into the first and second server groups. The computing flow may indicate a direction of network traffic from one of the first or second server groups to another of the first or second server groups.

The generating firewall rules may include identifying a first virtual machine that has been provisioned into the first server group included in the cloud chamber, examining the information and determining that the second server group, having been provisioned with a second virtual machine, connects to the first server group, obtaining an IP address assigned to the second virtual machine, and inserting the IP address into a firewall rule for the first virtual machine to allow the first virtual machine to receive connections from the second virtual machine.

The generating firewall rules may include identifying a first virtual machine that has been provisioned into the first server group included in the cloud chamber, examining the information and determining that the first server group connects to a second server group, the second server group, having been provisioned with a second virtual machine, obtaining an IP address assigned to the second virtual machine, and inserting the IP address into a firewall rule for the first virtual machine to allow the first virtual machine to connect to the second virtual machine.

In a specific implementation, the method further includes determining from the received information that virtual machines provisioned into the first server group send data to virtual machines provisioned into the second server group, obtaining an IP address of a virtual machine in the second server group, and generating for each virtual machine in the first server group a first firewall rule including the IP address of the virtual machine in the second server group to allow each virtual machine in the first server group to send data to the virtual machine in the second server group.

In a specific implementation, the generating a set of firewall rules includes examining the computing flow specified in the information, determining from the examination that the virtual machines provisioned into the first server group receive data from the virtual machines provisioned into the second server group, receiving from an agent installed on a virtual machine in the second server group a message comprising an IP address assigned to the virtual machine in the second server group, and generating a first firewall rule for each virtual machine in the at least first server group included in the cloud chamber. The first firewall rule includes the IP address assigned to the virtual machine provisioned into the second server group to allow the virtual machines in the cloud chamber to receive data from the virtual machine provisioned into the second server group.

In a specific implementation, a method includes receiving user input including an application profile for an application, the application profile specifying a set of computing tiers, a set of computing components, and a set of computing flows involving the computing tiers and components, receiving user input identifying at least a first computing tier to include in a cloud chamber, examining a first computing flow specified in the application profile to determine that virtual machines provisioned into the first computing tier receive data from virtual machines provisioned into a second computing tier, obtaining an Internet Protocol (IP) address assigned to a virtual machine provisioned into the second computing tier, and generating a first firewall rule for a virtual machine provisioned into the first computing tier included in the cloud chamber. The first firewall rule includes the IP address assigned to the virtual machine provisioned into the second computing tier to identify the virtual machine in the second computing tier as being an allowed source of data.

The obtaining an IP address assigned to a virtual machine provisioned into the second computing tier may include after the virtual machine has been provisioned into the second computing tier, receiving from an agent installed on the virtual machine in the second computing tier a message comprising the IP address assigned to the virtual machine in the second computing tier.

The method may further include examining a second computing flow specified in the application profile to determine that virtual machines provisioned into the second computing tier send data to virtual machines provisioned into a third computing tier, obtaining an IP address of a virtual machine provisioned into the third computing tier, and generating a second firewall rule for the virtual machine provisioned into the second computing tier included in the cloud chamber. The second firewall rule may include the IP address assigned to the virtual machine provisioned into the third computing tier to identify the virtual machine in the third computing tier as being an allowed destination of data.

In a specific implementation, the method further includes examining a second computing flow specified in the application profile to determine that virtual machines provisioned into the first computing tier send data to a first component, the first component being provided by a cloud services provider for the application, obtaining an IP address assigned to the first component, and generating a second firewall rule for the virtual machine provisioned into the first computing tier included in the cloud chamber. The second firewall rule includes the IP address assigned to the first component to identify the first component as being an allowed destination of data. The first component may include a database. The method may further include distributing the first firewall rule to each virtual machine provisioned into the first computing tier included in the cloud chamber.

Other objects, features, and advantages of the present invention will become apparent upon consideration of the following detailed description and the accompanying drawings, in which like reference designations represent like features throughout the figures.

DETAILED DESCRIPTION

Figure 1:
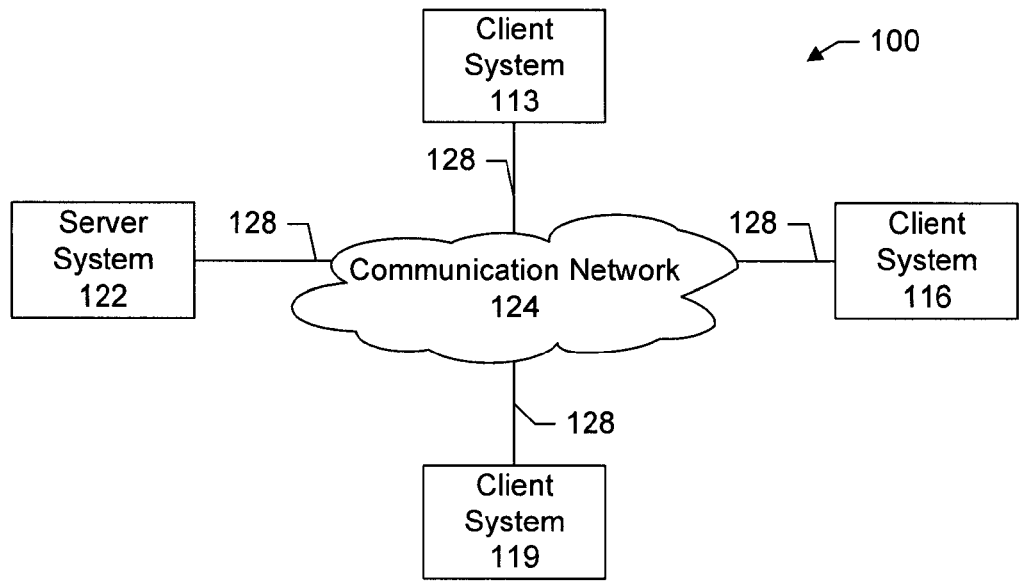
FIG. 1 shows a computer network system within which the present invention may be embodied.

FIG. 1 is a simplified block diagram of a distributed computer network 100. Computer network 100 includes a number of client systems 113, 116, and 119, and a server system 122 coupled to a communication network 124 via a plurality of communication links 128. There may be any number of clients and servers in a system. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment and is not intended to limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both a client or a server depending on whether the computer system is requesting or providing information. Additionally, although aspects of the invention have been described using a client-server environment, it should be apparent that the invention may also be embodied in a stand-alone computer system. Aspects of the invention may be embodied using a client-server environment or a cloud-computing environment.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

Client systems 113, 116, and 119 enable users to access and query information stored by server system 122. In a specific embodiment, a "Web browser" application executing on a client system enables users to select, access, retrieve, or query information stored by server system 122. Examples of web browsers include the Internet Explorer® browser program provided by Microsoft® Corporation, and the Firefox® browser provided by Mozilla® Foundation, and others.

Figure 2:
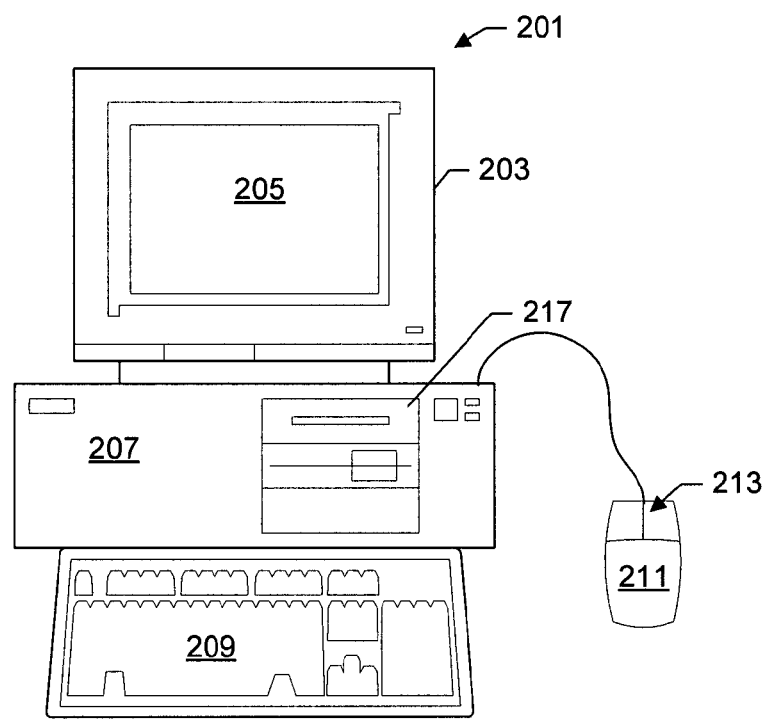
FIG. 2 shows a more detailed diagram of an example of a client or computer which may be used in an implementation of the invention.

FIG. 2 shows an example of a client or server system that may be used to execute software of the present invention. In an embodiment, a user interfaces with the system through a computer workstation system, such as shown in FIG. 2. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like.

Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc®), flash and other nonvolatile solid-state storage (e.g., USB flash drive), battery-backed-up volatile memory, tape storage, reader, and other similar media, and combinations of these.

A computer-implemented or computer-executable version of the invention may be embodied using, stored on, or associated with computer-readable medium or non-transitory computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software may also be stored or reside on mass storage device 217 (e.g., hard disk, magnetic disk, tape, or CD-ROM). As a further example, code may be transmitted via wires, radio waves, or through a network such as the Internet.

Figure 3:
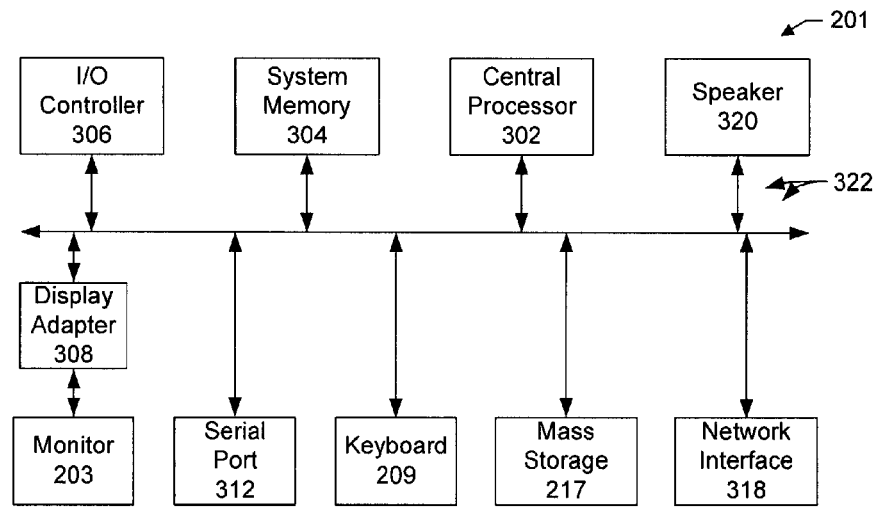
FIG. 3 shows a system block diagram of a computer system.

FIG. 3 shows a system block diagram of computer system 201. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. In an embodiment, a computer system includes additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a suitable computer system. Other configurations of subsystems suitable for use will be readily apparent to one of ordinary skill in the art.

Computer software products may be written in any of various suitable programming languages, such as C, C++, C#, Pascal, Fortran, Perl, Matlab® (from MathWorks), SAS, SPSS, JavaScript®, AJAX, Java®, SQL, and XQuery (a query language that is designed to process data from XML files or any data source that can be viewed as XML, HTML, or both). The computer software product may be an independent application with data input and data display modules. Alternatively, the computer software products may be classes that may be instantiated as distributed objects. The computer software products may also be component software such as Java Beans® (from Oracle Corporation) or Enterprise Java Beans® (EJB from Oracle Corporation). In a specific embodiment, the present invention provides a computer program product which stores instructions such as computer code to program a computer to perform any of the processes or techniques described.

An operating system for the system may be one of the Microsoft Windows® family of operating systems (e.g., Windows Server 2008, 2012, Windows NT®, Windows 2000®, Windows XP®, Windows XP® x64 Edition, Windows Vista®, Windows 7®, Windows CEO, Windows Mobile®), Linux, HP-UX, UNIX, Sun OS®, Solaris®, Mac OS X®, Alpha OS®, AIX, IRIX32, or IRIX64. Other operating systems may be used. Microsoft Windows® is a trademark of Microsoft® Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

Figure 4:
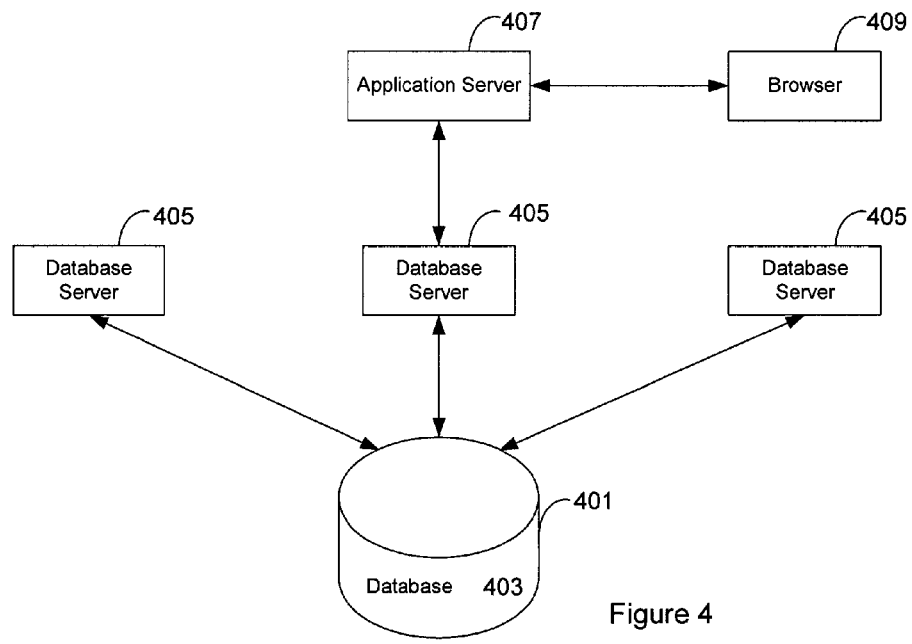
FIG. 4 shows a data source or data service in the form of a database system.

FIG. 4 shows a data source or data service in the form of a database system within which the present invention may be embodied. A database may be part of a database management system. One suitable database management system architecture is a three-tiered architecture as shown.

In a first tier is the core of a database management system, a central storage 401 that holds or stores a database or repository 403. The database typically resides on one or more hard drives, and is generally part of a larger computer system. The information may be stored in the database in a variety of formats. An example is a relational database management system (RDMS) which uses tables to store the information.

In a second tier are database servers 405. The database servers are instances of a program that interacts with the database. Each instance of a database server may, among other features, independently query the database and store information in the database. Depending on the implementation, the database servers 405 may or may not include user-friendly interfaces, such as graphical user interfaces.

In a third tier is an application server 407. There may be multiple application servers. In an implementation, the application server provides the user interfaces to the database servers. By way of example, the application server may be a web application server on the Internet or any other network. The application server may also be a virtual database server or a virtual directory server. The application server may provide user-friendly mechanisms and interfaces for accessing the database through the database servers. In an implementation, a web browser 409 is utilized to access the application server.

Figure 5:
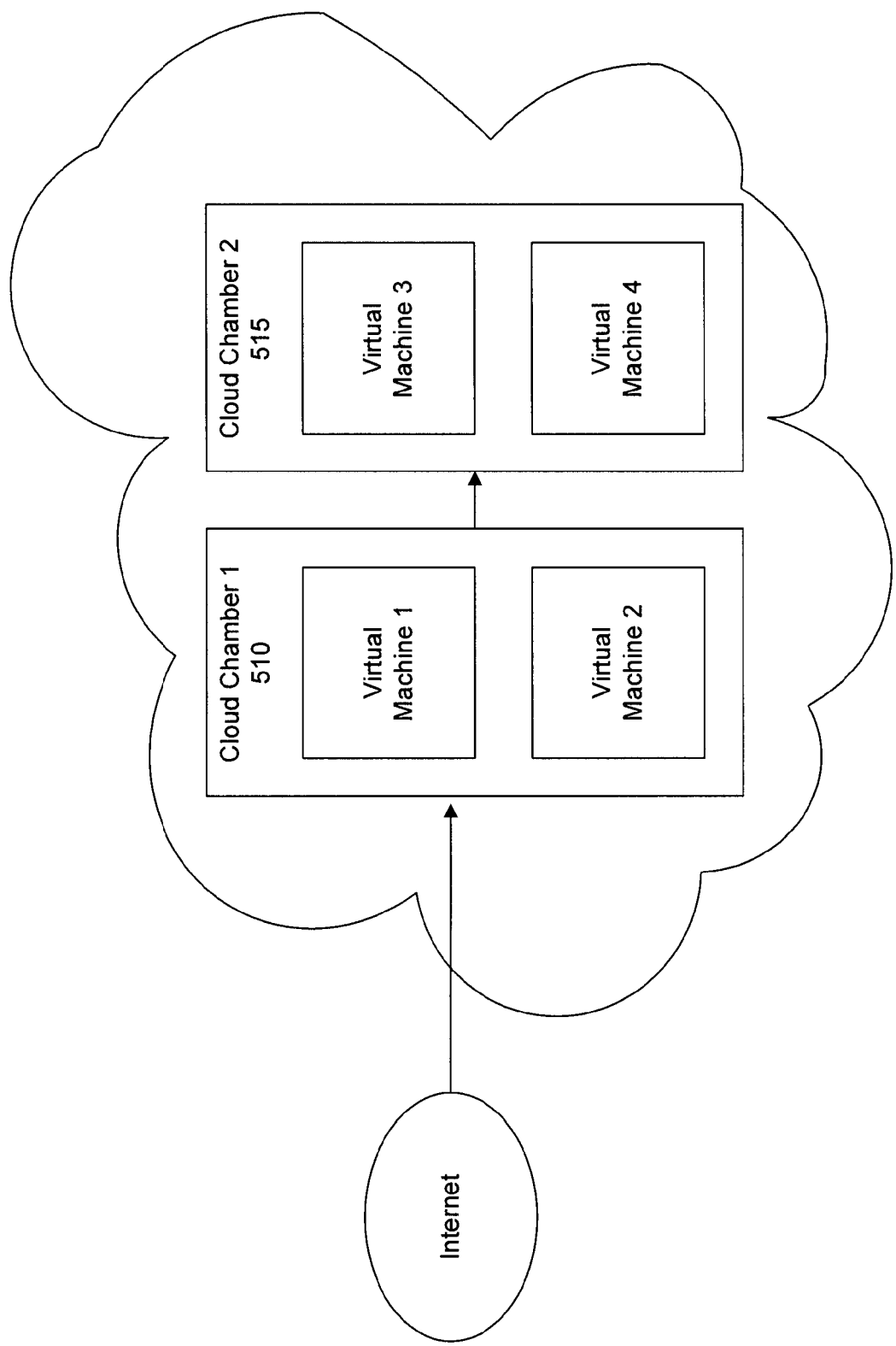
FIG. 5 shows an example of computing environment having a cloud chamber system.

FIG. 5 shows an example of a cloud-computing environment having a cloud chamber. In the example shown in FIG. 5, there is a first cloud chamber 510, and a second cloud chamber 515 implemented in the cloud-computing environment. The first cloud chamber includes computing resources such as first and second virtual machines. The second cloud chamber includes another set of computing resources such as third and fourth virtual machines. It should be appreciated that a cloud chamber can include any number of virtual machines and there can be any number of cloud chambers.

In a virtual machine environment, the hardware platform may be referred to as a host, host machine, or host computer. The host uses the virtualization software to run the virtual machines or virtual devices. Generally, virtualization is an abstraction layer that allows multiple virtual environments to run in isolation, side-by-side on the same physical machine. A virtual machine (VM) is a software implementation of a machine (e.g., a computer) that executes programs like a physical machine. In other words, the virtual machine is a software abstraction of a physical computer system that is installed as a "guest" on the "host" hardware platform.

A virtual machine can include a guest operating system, guest applications running on the guest operating system, and virtual hardware which represents a hardware state of the virtual machine. The virtualization software may include a hypervisor or virtual machine monitor (VMM) that presents the guest operating system with a virtual operating platform. Virtual hardware refers to the hardware resources allocated to the virtual machine and is mapped to the hardware platform. The virtual hardware may include virtual disks, virtual processors, virtual system memory, and various virtual devices for which the guest operating system includes corresponding drivers. A host hardware platform may host multiple virtual machines. Each virtual machine may be assigned an identifier such as an internet protocol (IP) address.

In a specific implementation, the cloud-computing environment is provided by a cloud services provider. The type of cloud provided by a cloud services provider may be referred to as a public cloud. A public cloud refers to a computing infrastructure in which services are rendered over a network that is open for public use (e.g., Internet). The public cloud can offer on-demand network access to a shared pool of configurable computing resources (e.g., networks, servers, storage, applications, and services).

Some characteristics of a public cloud include on-demand self-service (e.g., consumer can unilaterally provision computing capabilities such as server time and network storage), resource pooling (e.g., the provider's computing resources are pooled to serve multiple consumers using a multi-tenant model, with different physical and virtual resources such as storage, processing, memory, and network bandwidth dynamically assigned and reassigned according to consumer demand), elasticity (e.g., capabilities can be elastically provisioned and released to scale outward and inward based on demand), and metering (e.g., resource usage can be monitored and reported for billing). Some examples of cloud computing service providers include Amazon Web Services (AWS), Microsoft Azure, HP Public Cloud, IBM SmartCloud, and many others. It should be appreciated, however, that the cloud chamber system may be implemented in any type of cloud such as a private cloud, community cloud, hybrid cloud, or distributed cloud.

In a specific embodiment, a cloud firewall is implemented in a cloud computing environment. In this specific embodiment, the cloud firewall helps to protect enterprise applications, virtual machines, data, or combinations of these running in the cloud. In this specific embodiment, without using any TCP/IP network topology information, a "cloud chamber" is defined as a virtual peripheral firewall structure to protect those enterprise resources inside a protected zone which is isolated away from the outside world.

The traditional network topology based firewall protects resources and data sitting on the sub-tree "behind" the firewall. A "cloud chamber" (i.e., cloud firewall) as described in this patent application instead implements a logical structure where resources are protected if placed "inside" the chamber. To protect the resources and data inside the chamber, a set of firewall rules can be generated for all virtual machines, physical servers, other components, or combinations of these inside the chamber to explicitly check and filter all communication traffics among them inside the chamber and the communication traffics with components outside of the chamber that cross the boundary of the chamber.

Some benefits of the "cloud chamber" include:

1) All applications and virtual machines placed logically inside this structure are protected against traffic coming from outside of this structure. The cloud firewall is a peripheral firewall that protects the logical boundary, not physical network boundary.

2) All applications and virtual machines behind this cloud firewall may freely communicate with each other (based on security policy) regardless of the underlying network structure for the "cloud chamber." The private communications inside the "cloud chamber" can be such that they do not impact the network performance for the applications and virtual machines.

3) The communication from the applications or virtual machines going outside of the "cloud chamber" may also be protected/prevented based on the security policy.

The cloud chamber is a virtual and logical structure. It can be implemented anywhere in a cloud regardless of the underlying network topology. All resources provisioned inside this logical structure can be protected by the security policy and firewall rules. All other resources can be considered "outside" of this protection zone.

Multiple cloud chambers can be implemented jointly to satisfy the security policies that protect all applications running in a cloud. These policies can define ingress traffics, egress traffics, as well as inter chamber traffics. These policies can be stateful and sophisticated. In a specific embodiment, security policy at the chamber level is "statically" defined by users via the definition of the application profile, once. The firewall rules for all items in a chamber (e.g., virtual machines (VMs)) will be automatically generated from the application profile, along with the chamber definition as well as the provisioning information for the computing resources (e.g., VMs, components, and their IP addresses), and applied to each VM and other components. When a cloud orchestration manager provisions a VM (add or delete), the firewall rules will be updated in all involved VMs (i.e., the neighbors). Meanwhile, the application profile along with the security policy may be never or rarely changed.

In the example shown in FIG. 5, the two cloud chambers together implement a two tier computing structure in a cloud. Tier-1 can include any number of servers and is implemented in cloud chamber 1 and is connected to the Internet. Tier-1 connects to Tier-2. The first virtual machine (VM1) and second virtual machine (VM2) run tier-1 applications. For example, tier-1 may host application presentation components or services.

Likewise, Tier-2 can include any number of servers and is implemented in cloud chamber 2. In the example shown in FIG. 5, the third virtual machine (VM3) and fourth virtual machine (VM4) run tier-2 applications. Tier-2 may connect to a database (not shown). For example, the business logic for the application may reside at tier-2. The first cloud chamber 1 implements a firewall policy that protects applications running in the first and second virtual machines. Given the elastic nature of a cloud environment, more servers (e.g., VMs or physical servers) can be added or removed by the cloud orchestration system to or from the Tier-1 group and the Tier-2 group, depending on the computing needs.

In a specific implementation, from the perspective of the first cloud chamber 1, all other resources (e.g., computers on Internet, third virtual machine, or fourth virtual machine) are all outside of its firewall. The first and second virtual machines are behind its firewall. From the perspective of the second cloud chamber 2, only the third and fourth virtual machines are behind its firewall. The firewall rules are correspondingly implemented.

The security policies can be further defined such that the first and second virtual machines are not allowed to communicate with each other. This may be referred to as a "silo tier" in a cloud chamber. The security policies can be defined such that all communications between the third and fourth virtual machines inside Tier-2 are allowed. This may be referred to as a "connected tier."

For example, in some cases it will be desirable for the cloud applications to implement a "silo" property inside a tier. In FIG. 5, VM1 and VM2 are in Tier-1. VM1 and VM2 are serving the same function or role. They typically do not need to communicate with each other. Instead, they communicate with Tier-2 machines, e.g., VM3 and VM4. So when specifying "silo tier," the security policy is requesting to implement a tight security implementation where any communication between VM1 and VM2 are not allowed. If any traffic between VM1 and VM2 is detected by the firewall system, the traffic should be blocked and an alert is generated as a warning. A security policy, "silo" versus "connected," may be associated to the tier or server group, rather than the cloud chamber. A cloud chamber can include a tier that is silo with another tier that is connected.

However, there can be exceptions. Some applications may require VM1 communicating with VM2 occasionally. A user can then specify a "connected tier," which is a security policy that allows mutual communications among servers inside a tier. It should be appreciated that the user may specify more tiers with details to explicitly describe the communications/computing flows among VMs. These descriptions can be the "security policies" where the cloud chamber system will then explicitly protect those by generating detailed firewall rules for each different VMs in different tiers. In a specific embodiment, the security policy is or is based on the computing flows.

In a specific embodiment, the application profile with the computing flows describes how the tiers (and thus the VMs or servers provisioned into those tiers) are allowed to communicate with each other. Based on this information, the firewall rules are then generated for each group of VMs in each tier to implement security. Together, that protects the computing flows, which matches or corresponds with the definition of "cloud chamber."

In another specific embodiment, there can be a separate security policy that can be attached the application profile. The separate security policy can specify additional network security and actions as desired. As an example, in a specific embodiment there can be a specific security policy that tracks a malicious computing flow or flows. The flows may be defined in the application profile and may route the traffic to a standby security server or system for monitoring and behavior analysis. The traffic following this path can trigger an action, depending on the analysis result, to lock or place the source server into a security quarantine area for further screening. In another specific embodiment there can be a defined malicious computing flow that will be blocked by the firewall and directly trigger the lock of the source server into a quarantine area for further screening without depending on a live security analysis.

The "cloud chamber" structure is virtual, logical, and does not exist physically in a cloud. In a specific embodiment, the chamber firewall system is implemented in a distributed fashion with firewall components in each of the items (e.g., virtual machines or physical servers) involved inside all chambers. These firewall components can filter network traffic at the virtual machine level.

Figure 6:
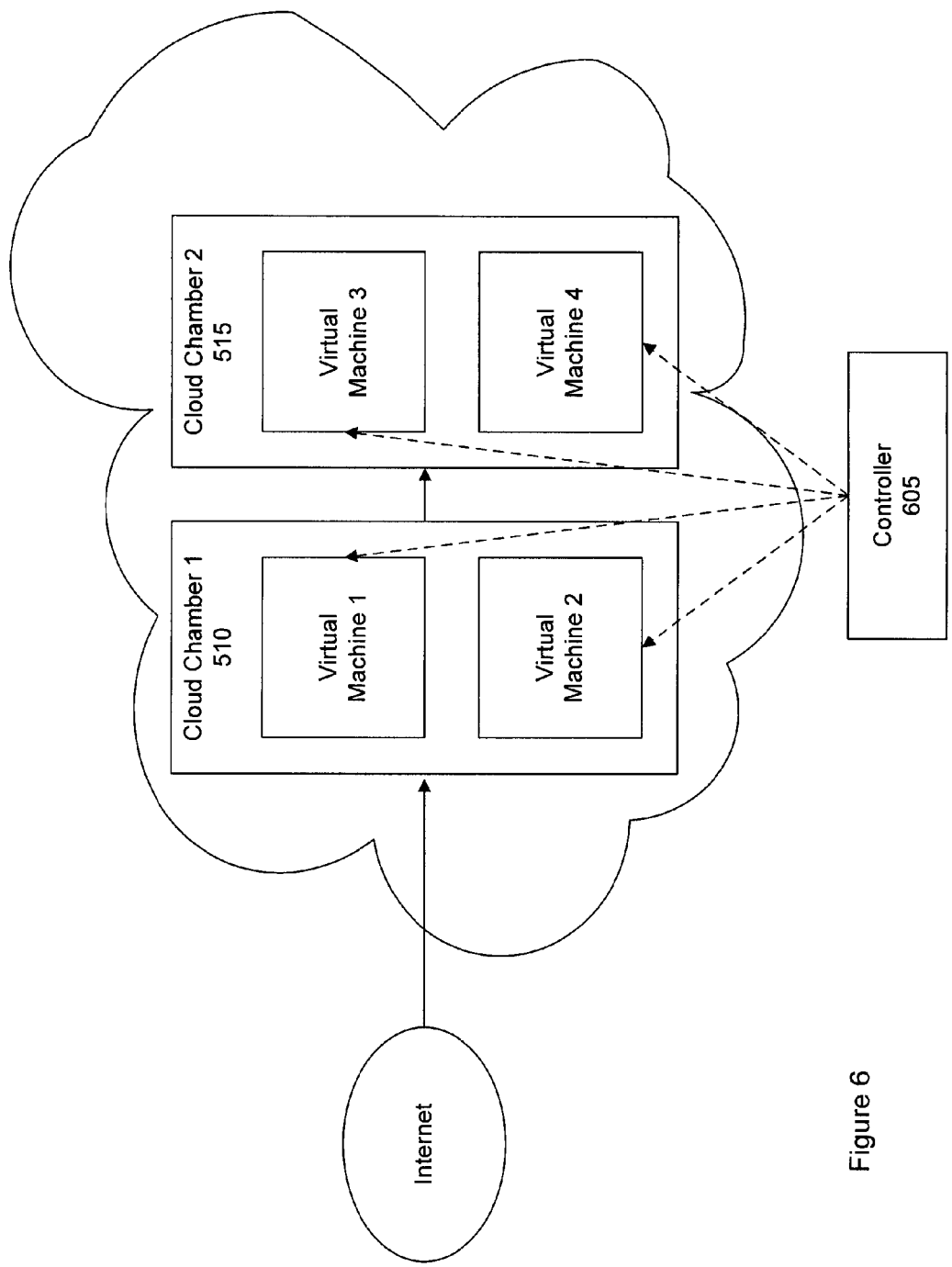
FIG. 6 shows another example of a computing environment having a cloud chamber system.

FIG. 6 shows a specific embodiment of a system implementing a cloud chamber. In this specific embodiment, there is a central controller or controller server 605 that records the application profile, the multiple chamber structure (logical) as well as the peripheral security policies. These central security policies are then compiled and converted to detailed firewall rules that are pushed into each of the virtual machines to be protected by the cloud chamber system. The central controller is a policy holder and compiler. The actual network traffic is not routed to or filtered by the controller.

For a "connected tier" in a cloud chamber, the firewall rules for all virtual machines inside the tier can be slightly different due to the definition of the "neighbors" that each virtual machine can or cannot connect with, as well as the firewall rule definition in terms of source and destinations for the allowed traffic. Given a cloud chamber structure, the central peripheral security policy stored in the controller can be static and not changing or reacting to the addition or deletion of VMs from the tier in the chamber. This security policy is defined to protect the applications running in the cloud. However, the compiled firewall rules for each virtual machine can be dynamically changing, depending on the virtual machines (e.g., "neighbors") added or deleted from the chamber structure. In a specific implementation, the enterprise IT staff or administrator programs the central peripheral security policy in the system. The firewall rules are automatically compiled, pushed, and/or updated in each virtual machine.

Consider, as an example, the environment shown in FIG. 5. In this example, there can be two tiers of servers. Tier 1 which includes VM1 and VM2 is connected to the Internet with ingress port 80. Outbound traffic is not allowed. Tier1 then connects to tier2 (which includes VM3 and VM4) with TCP with port 5000. Reverse traffic is not allowed (but return traffic is allowed). Tier1 is "silo." Tier2 is "connected." There is an application profile with computing flows connecting server groups (or other components, such as a load balancer, subnet groups, database, and so forth). A subnet group can define a subnet IP address range that is allowed to connect to a tier. This may be defined to support network administrators accessing servers or to support some system or cloud related application or flows (e.g., a central storage system provided by the cloud service provider as part of the cloud service).

The cloud chamber system brings many applications and business benefits as described below. In a cloud computing environment where the network and infrastructure are virtualized, it is critical for the security implementation to work seamlessly with the virtual infrastructure and be managed and integrated with the cloud management system. This cloud chamber firewall system can implement all firewall rules on virtual machines, not on a network sub-tree. As a result, this system can work seamlessly with the cloud management infrastructure, allowing static security policy programming and dynamic firewall rule updates for elastic cloud computing.

The cloud chamber firewall system is virtual and yet carries the concept of peripheral firewall that is easy to grasp by the enterprise IT when it comes to implementing security and ensuring corporate compliance. The cloud chamber firewall system is a virtual infrastructure where the central security policy can be programmed in the central controller without provisioning any virtual machines. The central policy can be easily maintained, and the security intelligence can be recorded without frequent change. The dynamic changes in the virtual machine firewall rules are driven by on-demand computing and are all automated.

The performance for the cloud chamber firewall system is optimized or improved. This firewall system can be a logical peripheral firewall (e.g., centralized model), and yet the implementation is distributed. That is, there is no central virtual machine that executes the firewall packet filtering or forwarding for all or a majority of cloud servers as the performance bottleneck. Therefore, a hardware accelerator for the server that implements a central firewall may not be needed in the cloud. A high speed or customized network to accommodate the central firewall system for performance reason is not required either.

The cloud chamber firewall system is agnostic to the underlying network topology and the hypervisor system. This solution can be owned and implemented by the enterprises that are leasing resources in a public cloud, without coupling with the administration support from the lower level cloud datacenter operator. Also this solution applies to multiple IaaS (Infrastructure as a Service) cloud datacenters which may be using different hypervisors. This solution supports a unified security management view over multiple and hybrid cloud implementations at a lower layer for ease of use and consistent security policy implementation. It also supports a "cloud broker" business model that is owned by a neutral vendor on the top of all IaaS cloud vendors.

Figure 7:
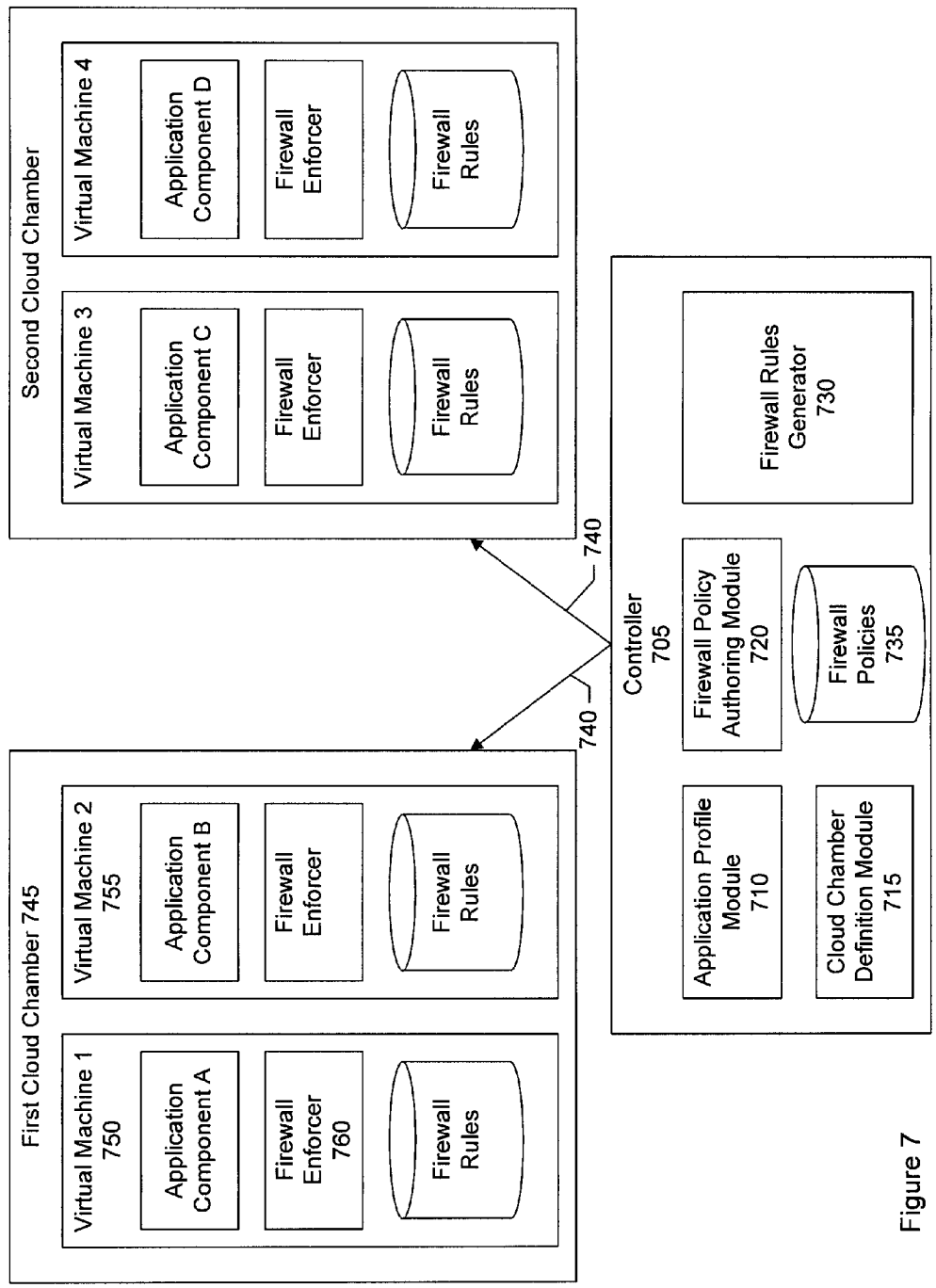
FIG. 7 shows a block diagram of a cloud chamber system.

FIG. 7 shows a more detailed diagram of a specific implementation of a cloud chamber system for cloud-computing environments. This system includes a controller or controller server 705. The controller includes an application profile module 710, a cloud chamber definition module 715, a security policy authoring module 720, a firewalls rules generator 730, and a database 735 for storing security policies.

The application profile module is responsible for receiving, accessing, defining, or obtaining an application profile for an application to be deployed in a cloud-computing environment. The application profile specifies a configuration of cloud resources and application components along with the computing flow information on how the resources are communicating among them.

In a specific implementation, the application profile module provides a user interface (e.g., graphical user interface (GUI)) through which an administrator can specify the configuration and computing flows of the server groups or tiers over which the application will be distributed. The GUI tool may provide user controls for defining, creating, identifying, or specifying server groups, computing tiers, computing components, and computing flows. The GUI tool may include controls for drag-and-drop and drawing the computing flows. In another specific implementation, the application profile module provides an API engine that allows the user (e.g., administrator) to define the application profile with API commands.

The cloud chamber definition module can be used by an administrator to select, specify, or identify the computing resources, such as the computing tiers, server groups, components, or combinations of these to be included in a cloud chamber. The module may present the user or system administrator with a user interface through which the administrator can select which computing component, server group, or tiers to include in the cloud chamber. For example, the administrator may use the GUI tool to click on a particular server group to include in a particular cloud chamber. The module may implement an API engine that allows users to define the chamber with API commands.

The security policy authoring module provides an interface for the user to create, edit, modify, add, delete, and update security policies, beyond the information provided by the application profile. Security policies are stored in the security policy database. A security policy may define at a high-level how an organization's firewalls should handle inbound and outbound network traffic for specific IP addresses and address ranges, protocols, applications, and content types based on the organization's information security policies.

The firewall rules generator is responsible for analyzing, parsing, or examining the application profile (including the security policies) and cloud chamber definition in order to generate firewall rules for all VMs. The generator can deploy, distribute, send, or transmit 740 the firewall rules to each computing resource (e.g., virtual machine) in a cloud chamber.

The firewall rules can then be stored in a firewall rules database at a virtual machine in a cloud chamber. For example, as shown in FIG. 7, there can be a first cloud chamber 745 that includes first and second virtual machines 750 and 755, respectively. The virtual machines provide execution environments for various components, copies, or instances of an application that is deployed in the cloud. In the example shown in FIG. 7, a copy of application component A has been installed at the first virtual machine. A copy of application component B has been installed at the second virtual machine.

Each virtual machine further includes a firewall enforcer 760. The firewall enforcer at a virtual machine is responsible for enforcing the firewall rules that have been distributed to the virtual machine. The enforcer inspects, at a respective virtual machine, network traffic with respect to the virtual machine to determine whether the traffic should be blocked or allowed. The traffic can include inbound traffic (e.g., traffic sent to the virtual machine), outbound traffic (e.g., traffic to be forwarded from the virtual machine), or both. In other words, network traffic is filtered at a particular device (e.g., virtual machine) in the cloud chamber.

Figure 8A:
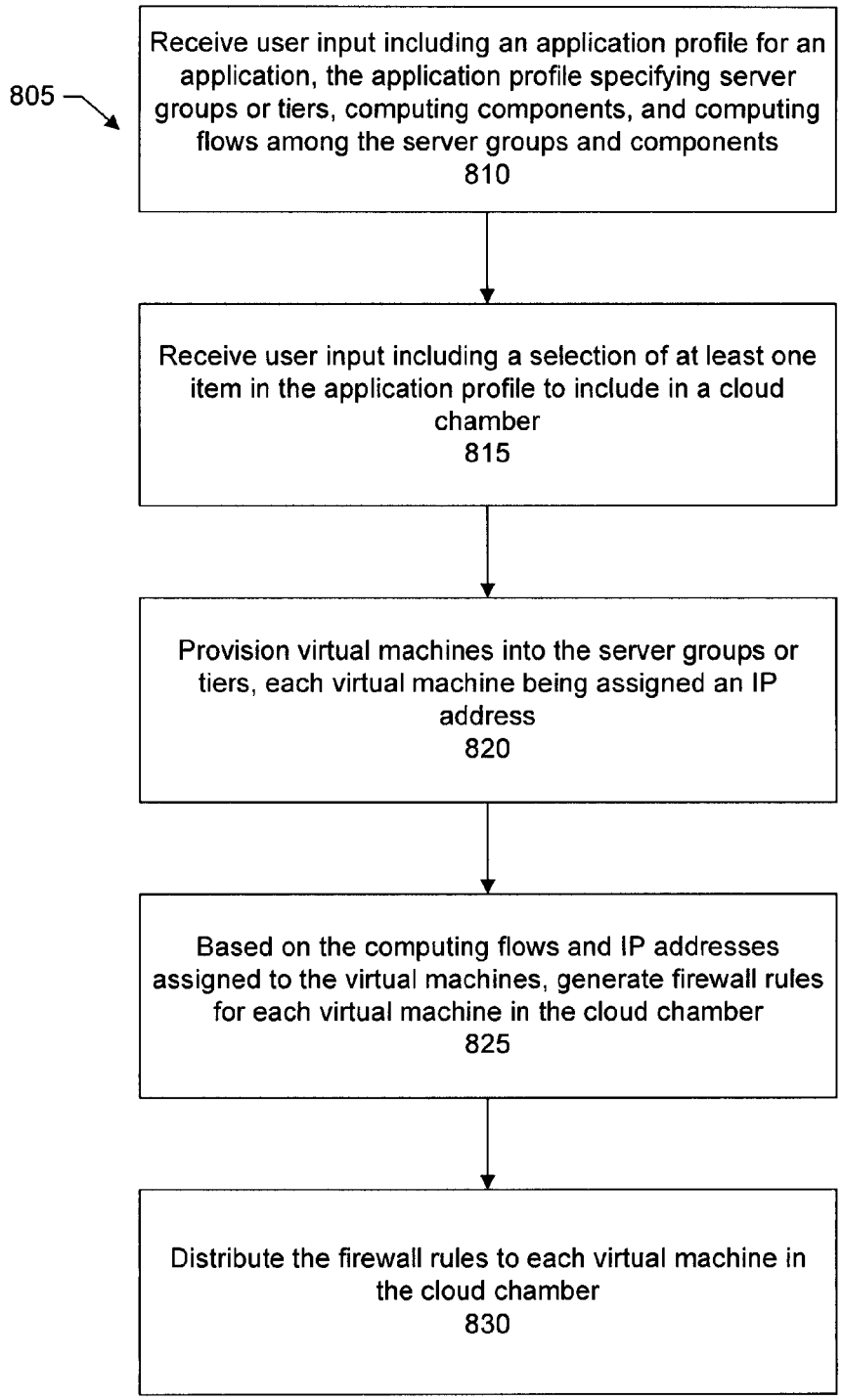
FIG. 8A shows an overall flow diagram of a cloud chamber system.

FIG. 8A shows an overall flow 805 for establishing a cloud chamber system that can protect applications and virtual machines in a cloud-computing environment. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other implementations may not be exactly the same as the steps presented and may be modified or altered as appropriate for a particular process, application or based on the data.

In a step 810, the system receives user input including information about an application to be deployed in a cloud-computing environment. The information may identify computing tiers, groups or server groups, computing components, and computing flows among the tiers, groups, and components. In a specific embodiment, the information is referred to as an application profile. It should be appreciated, however, that the information may be referred to using a different label (e.g., deployment profile, manifest, application framework, deployment schema, or the like).

A tier, server group, or component may be referred to as an item or item collection. A tier or server group can represent a collection of two or more computing nodes or machines that have the same role or function. A tier or server group can include any number of computing nodes. For example, depending upon factors such as the complexity of the application, the expected number of users, desired application response time, service requirements, and so forth, a tier may include 2, 5, 10, 50, 100, 500, or more than 500 computing nodes. A tier may include a single computing node.

In a specific implementation, the application profile is defined by receiving user input through a GUI tool of the application profile module. For example, the user can use the GUI tool to create a first server group, a second server group, and draw a first type of line from the first server group to the second server group to indicate that an allowed or permitted computing flow is from the first server group to the second server group. That is, the first server group is allowed to initiate a connection to the second server group. In this example, the first server group may be referred to as a connection source. The second server group may be referred to as a connection destination. Virtual machines to be provisioned into the first server group may be allowed to initiate connections to virtual machines to be provisioned into the second server group. Virtual machines to be provisioned into the second server group may be allowed to receive incoming connections from virtual machines to be provisioned into the first server group.

Alternatively, the user may draw a second type of line, different from the first type of line, to indicate that the first server group is not allowed to initiate a connection to the second server group. In this example, virtual machines to be provisioned into the first server group may not be allowed to initiate connections to virtual machines provisioned into the second server group.

There can be many different types of computing flows. For example, a first type of computing flow between a first server group and a second server group may allow items (e.g., virtual machines) in the first server group to send data (e.g., data packets, communications, connections, requests, messages, or network traffic) to virtual machines in the second server group. A second type of computing flow between a first server group and a second server group may allow virtual machines in the second server group to receive data from virtual machines in the first server group. The first and second type of computing flows may be referred to as legal, allowed, positive, or permitted computing flows.

A third type of computing flow between a first server group and a second server group may prevent virtual machines in the first server group from sending data to virtual machines in the second server group. A fourth type of computing flow between a first server group and a second server group may prevent virtual machines in the second server group from receiving data sent by virtual machines in the first server group. The third and fourth types of computing flows may be referred to as illegal, blocked, disallowed, negative, black listed, or not permitted computing flows.

It should be appreciated that a GUI is merely an example of a type of interface through which input can be provided to the system. For example, there can be a text-based interface. There can be a programmatic interface. In another specific implementation, the application profile may be created outside of the system. For example, the application profile may be created using a tool external to the system. The application profile may be formatted as an XML file. In this specific implementation, the system may include a translator to convert the application profile into a structure suitable for use by the system. Any competent technique may be used by the system to obtain or access an application profile.

The application profile describes a configuration of computing components (e.g., services), tiers of virtual machines for the application, and the computing flows among the tiers and components that implement the application. The application profile can also include other components to support network access to the application as well as the administrative access for management purpose. An application profile can describe the computing resources involved in realizing an enterprise application (e.g., web service, enterprise resource planning software (ERP), customer relationship management software (CRM), etc.) running in a cloud or hybrid cloud environment. An application profile can include but is not limited to multiple cloud domains, and in each one there can be multiple server groups, subnet components (e.g., port 80 coming from Internet, a virtual private network (VPN) gateway Internet Protocol (IP) address, or simply an IP address for the administrator's desktop machine for support purpose), and other components such as database, load balancers, and so forth.

There can be components identified in the application profile that are singletons or are not part of a group (e.g., is not a server group). A component may be implemented by a server having a particular function (e.g., load balancer). A component can represent a subnet having an IP address range or a single IP address (e.g., administrator control machine). Another example of component includes a database (e.g., Oracle database). The component (e.g., database) may be offered as a service by the cloud services provider. The IP address associated with the component (e.g., database) can be defined in the application profile so that the virtual machines in the server groups can connect to that database component. Thus, in the application profile, the component will have an IP address associated with it.

Consider, as another example, a requirement for the first tier to connect to the Internet with port 443 (security port). In other words, inbound traffic will be allowed through port 443 TCP to reach a first tier of secure ecommerce web servers. These network properties can be modeled as components defined as subnet components having an IP range that is open to all source IPs having port 443. In other words, a component can be used to model a single instance which can include a network subnet, a single load balancer, or a single database. In contrast, a server group or computing tier is empty (e.g., is without virtual machines) during the application profile definition stage. A particular group or tier can represent a collection of servers that will each implement similar functions for scalability. During production, specific servers may be scheduled into and out of a particular group to accommodate changes in loading, network traffic, and so forth.

Another example of a component includes a load balancer. In some cases, a load balancer will be provided by the cloud services provider. An application profile may define a first computing flow as being from a first load balancer component to a first server group, and a second computing flow as being from a second load balancer component to a second server group.

Cloud service providers continue to provide more and more infrastructure services to support the enterprise building of application. These services can be modeled as components in an application profile. For example, a service can include network storage, an attached virtual disk, or a DNS service, each of which can be modeled as components in the application profile. In turn, the computing flows to and from such components can be protected by the firewall rules generated by the system.

The server groups and the components are interconnected via computing flows (e.g., Transmission Control Protocol (TCP), User Datagram Protocol (UDP), etc.) to realize the enterprise application. A data transfer server (e.g., File Transfer Protocol (FTP) server or a Dropbox server) can be defined or modeled as a component as well. The cloud domains can be connected to each other via virtual networks as described in U.S. provisional patent applications 61/769,691, filed Feb. 26, 2013, and 61/770,320, filed Feb. 28, 2013, and U.S. patent application Ser. No. 14/187,091, filed Feb. 21, 2014, which are all incorporated by reference. Examples of cloud domains include Amazon Web Services, Microsoft Azure, or an enterprise internal private cloud domain.

A component can include or represent a router, switch, load balancer, generic IP device, server host, disk, interface, database, cluster, web server component, application server, process, DNS (Domain Name System) service, NFS (Network File System) service, LDAP (Lightweight Directory Access Protocol) service, authentication service, monitoring service, searching and indexing service, payment service, messaging service, workflow service, or email service—just to name a few examples.

An application profile can include one or more files that an enterprise administrator or developer provides to interface with the cloud orchestration system provided by the cloud service provider. The cloud orchestration system offered by the cloud servicer provider can use the application profile to deploy the application according to the configuration, specification, or requirements in the application profile. In another specific implementation, another cloud management system that overlays on the top of the cloud orchestration system can compile the information provided by the application profile and interoperate with the cloud orchestration system as the middle layer.

In a specific embodiment, when an enterprise user wishes to implement a cloud chamber system, the application profile will be created first, along with the definition of the cloud chamber. At this point, no VM will have been leased yet. In other words, the application profile and cloud chamber are defined before any virtual machines have been provisioned for the application. The application profile is typically a tier-based definition with computing flows and other components (e.g., load balancer, database, subnet group, and so forth) defined without any VM instance in it.

Then the administrator starts to work on the VM configuration with application software provisioned for each tier and saves them in the cloud database. At production, the administrator starts to drive the cloud orchestration system to provision VMs into the application profile (e.g., provision VMs into the computing tiers or server groups specified in the application profile). Once the VMs go into the tier structure, the cloud chamber system will automatically generate all firewall rules and enforce them in all newly added VMs in the different tiers. At production, the administrator typically will not modify the application profile (therefore, the tiers, the computing flows, e.g., the security policies) during the operations. In other words, there is a static setting of the security policies, and dynamic firewall rule generation and enforcement reacting to the elastic cloud computing.

A benefit of the cloud chamber system is that an existing application profile can be reused for generating the firewall rules. This helps to facilitate the implementation of a cloud chamber by reducing the amount of firewall configuration work that is typically required. In a specific implementation, an administrator can use the application profile receiving module to select and upload or import an application profile to the system.

Table A below shows an example of an application profile for an application named PuffyClouds.

TABLE A

```
<?xml version="1.0" encoding="UTF-8"?>
<cloud-application-configuration>
   <application-name>puffyclouds</application-name>
   <tiers>
     <tier-1>
        <name>load-balancer</name>
     </tier-1>
     <tier-2>
        <name>presentation</name>
```

TABLE A-continued

```
     </tier-2>
   </tiers>
   <computing-flows>
     <firstflow>
        <from>tier-1</from>
        <to>tier-2</to>
        <protocol>TCP</protocol>
        <port>5000</port>
     </firstflow>
     <secondflow>
        <from>tier-2</from>
        <to>database-component</to>
        <IP-address>IP1</IP-address>
        <protocol>TCP</protocol>
        <port>6000</port>
     </secondflow>
   </computing-flows>
</cloud-application-configuration>
```

The application profile example above is formatted as an Extensible Markup Language (XML) file. XML is a markup language that defines a set of rules for encoding documents in a format or structure that is both human-readable and machine-readable. The profile may be provided as a text file.

The characters making up an XML document include markup and content. Generally, strings that constitute markup either begin with the character "<" and end with a ">," or they begin with the character "&" and end with a ";." A tag is a markup construct that begins with "<" and ends with ">." An element is a logical document component which either begins with a start-tag and ends with a matching end-tag or consists only of an empty-element tag. The characters between the start- and end-tags, if any, are the element's content, and may contain markup, including other elements, which are called child elements. An attribute is a markup construct including a name/value pair that exists within a start-tag or empty-element tag.

Figure 8B:
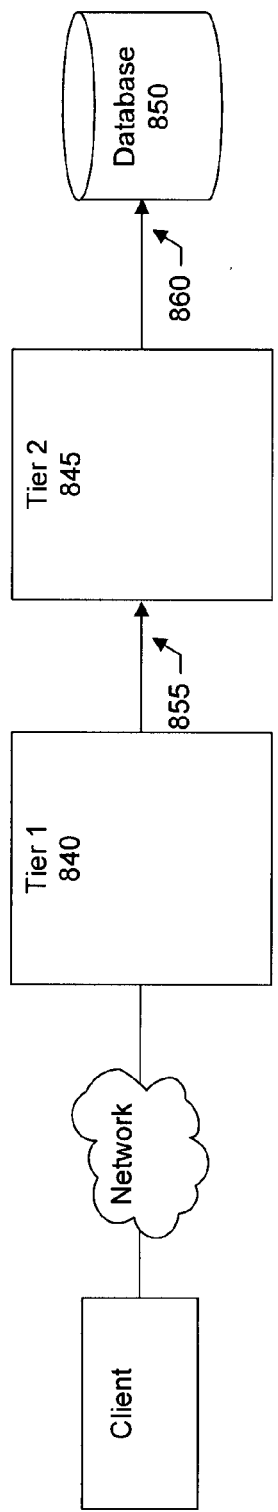
FIG. 8B shows an example of a computing flow that may be included in an application profile.

FIG. 8B shows a graphical example of the application profile specified in table A. As shown in the example of FIG. 8B, there is a first tier 840, a second tier 845, and a component 850. In the figure, the first and second tiers are shown as boxes or containers that are empty, unoccupied, unfilled, vacant, untenanted, or blank to indicate that the tiers have not yet been provisioned with virtual machines. In other words, in a specific embodiment, during the initial application profile definition phase, the tiers (or server groups) specified in the application profile are without virtual machines as the virtual machines have yet to be provisioned in, assigned to, or associated with a particular tier or group. That is, the virtual machines may not yet exist.

In this example, the component is a database. According to the computing flows specified in the application profile, there is a first computing flow 855. A direction of the first computing flow is from the first tier to the second tier. With respect to the first computing flow, the first tier may be considered a source. The second tier may be considered a destination. There is a second computing flow 860. A direction of the second computing flow is from the second tier to the database. With respect to the second computing flow, the second tier may be considered a source. The database may be considered a destination.

In this example, the first tier is to be provisioned with load balancer machines. The second tier is to be provisioned with presentation machines. The first computing flow connects the load-balancer to the presentation machines using, for example, TCP with port 5000. The second computing flow connects the presentation machines to a component representing a database with an IP address (e.g., IP1) using, for example, TCP with port 6000. Attributes of a computing flow can include a source group or component (e.g., tier 1) and a destination group or component (e.g., tier 2).

A direction of the computing flow can be derived by identifying the source and destination. This "direction" can be important security policy information, indicating what TCP traffic is allowed. For example, consider that a particular VM has a virus. One typical action a virus will do is a port scan. Assume that one of the presentation machines has a virus. The moment the virus fires an outbound traffic to the load balancer the traffic will get blocked and will trigger an alert. Likewise, when any other machine, other than the load balancer, in the application profile sends traffic to the presentation machine it will get blocked by the firewall and will trigger the alert. The reason is that this traffic is not defined as part of the legal computing flow in the application profile.

The application profile shown in table A and the graphical example of computing flows shown in FIG. 8B are merely examples. It should be appreciated that an application profile for the deployment of a complex enterprise application in a cloud-environment can include any number of cloud domains, computing tiers, server groups, components, computing flows, layers, conditions, requirements, specifications, and so forth. A computing tier may represent a group of servers. A computing tier may include one or more groups of servers.

Referring now to FIG. 8A, in a step 815, the system receives user input including a selection of at least one item, element, or item or element collection from the application profile to include in a cloud chamber. An item can include a server group, a computing tier, or a component. Any number of items can be selected for a cloud chamber. A cloud chamber can include a collection of items having computing flows defined in the application profile.

For example, a cloud chamber can include a single server group, two or more server groups (e.g., three server groups, four server groups, five server groups, or more than five server groups), a single computing tier, two or more computing tiers, a single component, or two or more components (e.g., five components, ten components, 50 components, 100 components, or more than 100 components). A cloud chamber can include a combination of different item types. For example, a cloud chamber may include a server group and components such as a database, load balancer, subnet group, DNS (Domain Name System) service, and so forth.

Figure 8C:
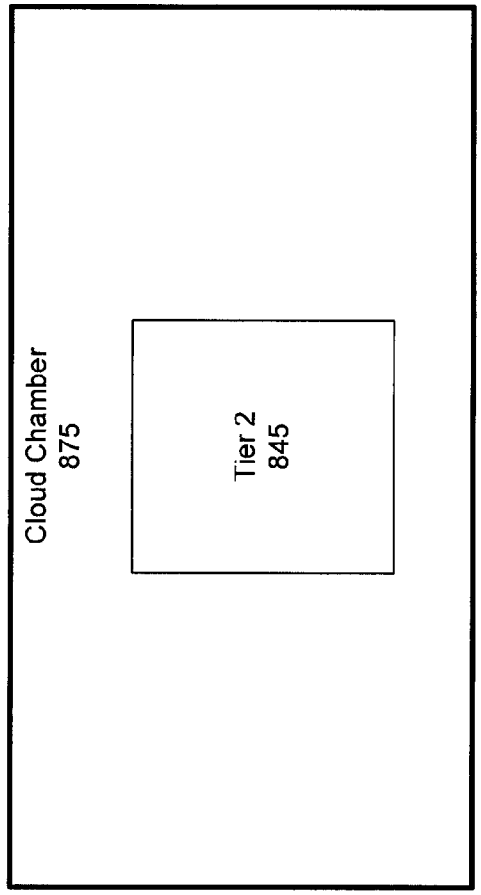
FIG. 8C shows an example of an item selected to be included in a cloud chamber.

FIG. 8C shows a block diagram of the second computing tier or server group having been selected to be included in a cloud chamber 875. The items or elements selected for inclusion in a cloud chamber represent the computing resources and the computing flows that are associated with them that the user wishes to protect via the system.

In some cases, there can be items not included for protection in the cloud chamber. For example, one reason why a server defined in the application profile would not be included in the cloud chamber definition may be when the administrator wants to take the group out of security protection temporarily to facilitate access to the server for maintenance purposes.

Another reason is that the server may be under a different security protection or ownership where a firewall through the system is not necessary or practical. For example, the protection of a particular component such as a database may be the responsibility of the cloud services provider. In this case, the database component may not be selectable for inclusion in the cloud chamber or may be excluded from the cloud chamber. The component may not be provisioned with a system-provided agent, firewall enforcer, or system-supported operating system that allows the component to be included in the cloud chamber.

Despite, however, a particular component being excluded from the chamber, some level of protection is still available because an IP address associated with the component can be included in a firewall rule for an item (e.g., virtual machine) in the cloud chamber. The firewall rule can include the IP address associated with the component to, for example, filter the connections that are allowed to the component, filter the connections coming from the component, or both.

Alternatively, as another example, there can be a component such as a virtual network storage device implemented as a server having system-supported software (e.g., system-supported operating system) that is selected for inclusion in the cloud chamber. When the device is instantiated, the firewall generator can generate firewall rules for that component and push the firewall rules to that component in the cloud chamber.

Consider, as an example, an application profile specifying a computing flow where a server group connects to the component. After provisioning there are three virtual machines provisioned into the server group, each virtual machine having been assigned IP address as a result of the provisioning. In this example, the component may be provided with three firewall rules to allow connections from the each of the three virtual machines in the server group. For example, a first firewall rule may include as a permitted source an IP address assigned to the first virtual machine in the server group. A second firewall rule may include as a permitted source an IP address assigned to the second virtual machine in the server group. A third firewall rule may include as a permitted source an IP address assigned to the third virtual machine in the server group.

In an embodiment, the cloud chamber is a "logic" boundary that includes one or more computing tiers, server groups, components, or combinations of these defined in the application profile. All servers in the server groups, the components, and the computing flows connecting them in a cloud chamber are then protected by cloud firewalls. In a specific implementation, a cloud firewall is created in each one of the servers and components as long as the components are implemented by an operating system (OS) recognized by the system. The cloud firewall includes the firewall rules to allow the defined computing flows that are connecting from a particular server or component to other neighbors (e.g., other groups or tiers), with the source and destination IP lock. With all the involved servers and components with source and destination IP lock, this firewall system forms a strongly connected graph or a partially connected graph for security interlock.

In a specific implementation, if a server group is defined as a "connected server group," then all servers inside the same server group can connect to each other; therefore, a firewall rule can be available to allow such as connection. If a server group is defined as a "silo server group," all neighbors in such a server group cannot connect to each other; therefore, the firewall rule that allows the communication may not be defined. In a specific implementation, the subnet component may not have a cloud firewall, since it is simply a network definition. However, its IP address range may be included in the firewall rules for interlock in the virtual machines that connect to this subnet component. If a database or a load balancer is implemented out of an OS-based server, the system can generate a cloud firewall for such a component. Their IP address information may be included in the firewall rules for interlock in the virtual machines that connect to these components.

The cloud chamber definition module may provide a user interface where the administrator can select the computing resources (e.g., virtual machines computing tiers or groups) to include in a cloud chamber. Instead or additionally, the definition module may provide an upload function where the administrator can upload or import a cloud chamber definition file to the system.

Table B below shows an example of a cloud chamber definition that may be provided to the system as an XML formatted file.

TABLE B

```
<?xml version="1.0" encoding="UTF-8"?>
<cloud-chamber-definition>
    <chamber-name>chamber-1</chamber-name>
    <chamber-items>
        <name>tier-2</name>
    </chamber-items>
</cloud-chamber-definition>
```

The cloud chamber definition above is formatted as an XML file. From the example above, tier-2 has been identified or selected to be included in a cloud chamber named "chamber-1." The cloud chamber definition can be provided to the system as a text file. It should be appreciated, however, that the cloud chamber definition file, application profile, or both may be structured or formatted using any type of markup language or may be written using a programming language or object-oriented programming language such as C++, Objective-C, Smalltalk, Java, C#, Perl, Python, Ruby and PHP.

In a step 820, virtual machines are provisioned into the various server groups, tiers, or both that have been specified in the application profile. During the provisioning, identifiers such as Internet Protocol (IP) addresses are assigned to the various machines. The tasks involved in provisioning can include, for example, leasing and scheduling machines from the cloud services provider, directing the installation of a particular operating system, application components, and other software on the machine, directing the configuration of various settings on the machine, identifying the amount of resources a machine should have (e.g., memory or storage), and the like.

In a specific implementation, provisioning the virtual machines can be performed through the system. In this specific implementation, the system includes a cloud manager module that can make the appropriate calls to application programming interfaces (APIs) provided by the cloud services provider. In another specific implementation, the provisioning is external to the system. In this specific implementation, identifiers assigned to the provisioned machines (e.g., IP address) can be obtained programmatically after virtual machines have been created or instantiated.

Figure 9:
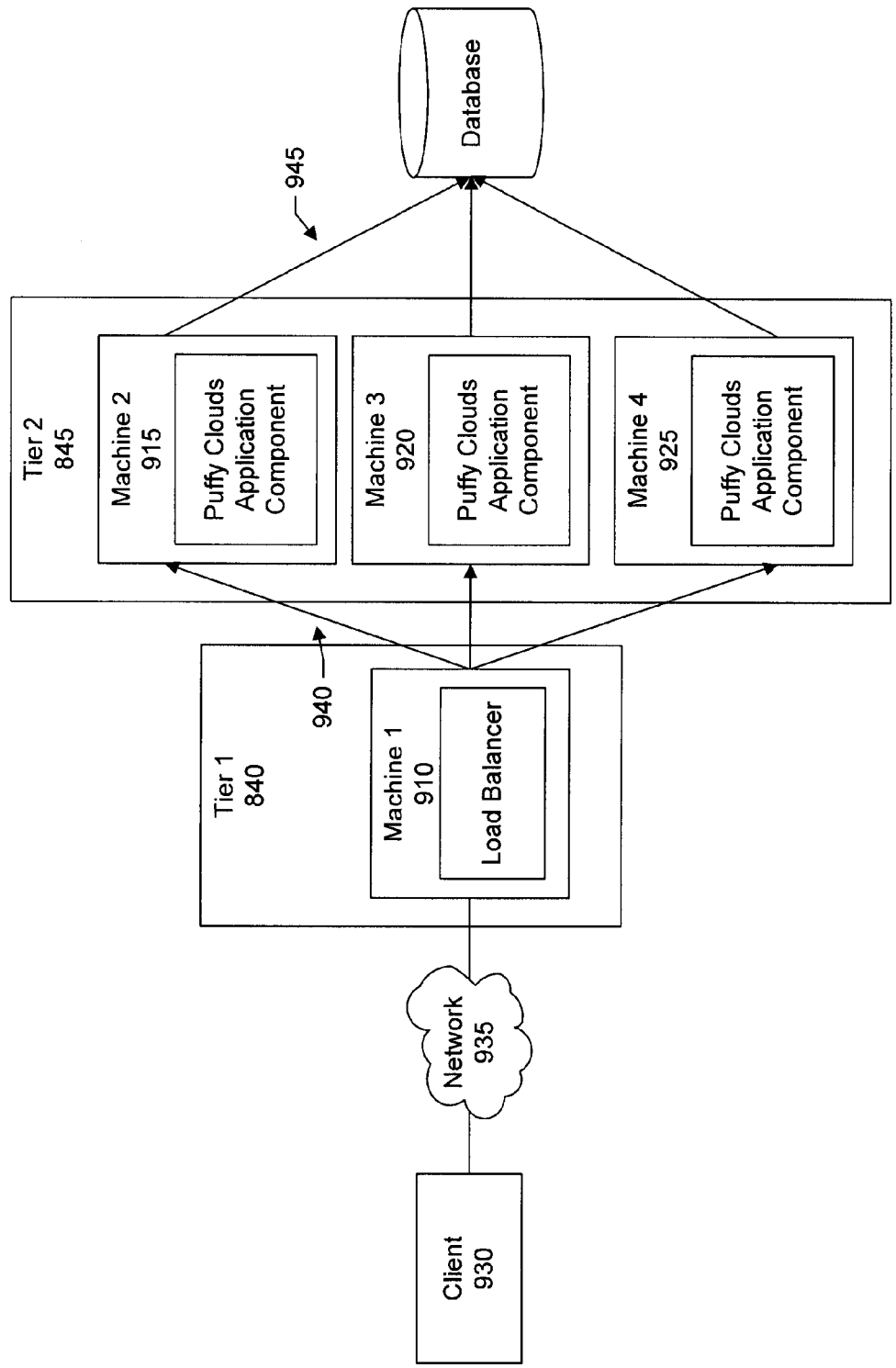
FIG. 9 shows an example of an application deployed in a cloud.

FIG. 9 shows an example of the computing environment in FIG. 8B having been provisioned with the various virtual machines to support the deployment of the PuffyClouds application. As shown in the example of FIG. 9, a virtual machine 910 has been provisioned into the first tier. Virtual machines 915, 920, and 925 have been provisioned into the second tier. More particularly, a load balancer has been deployed on virtual machine 910. A copy of the application presentation component has been installed on each of three virtual machines 915, 920, and 925.

The lines interconnecting the application components represent some of the computing flows. For example, lines 940 represent the first computing flow where the load balancer connects to the presentation machines using TCP with port 5000 according to the application profile in table A. Lines 945 represent the second computing flow where the presentation machines connect to the database component having IP address IP1 using TCP with port 6000 according to the application profile. A client 930 can connect to the application via a network 935.

In a specific implementation, the chamber definition is created before the administrator allocates any virtual machines to the application profile. Therefore, in this specific implementation, the definition of chamber will not and cannot include the instance of virtual machines (since they are not allocated yet). In this specific implementation, the application profile is also defined before the provisioning or leasing of the specific virtual machines for the application.

In a step 825, based on the computing flows specified in the application profile and the identifiers (e.g., IP addresses) assigned to the virtual machines, the system can dynamically or automatically generate firewall rules for each virtual machine in the cloud chamber. In a specific implementation, the application profile and cloud chamber definition phases involve user interaction and input. Once the application profile and cloud chamber has been defined and the virtual machines provisioned, the firewall generation rule phase can occur dynamically or automatically without or with relatively little user input. The automatic generation of the firewall rules using the application profile helps to speed the deployment of a firewall for the application and avoid human errors.

The architecture of the system allows for the automatic generation of firewall rules in a cloud-computing environment where, for example, the connection sources and connection destinations can be dynamically changing. That is, virtual machines can be continuously scheduled into and out of the cloud. By examining and analyzing the computing flows in the application profile, however, the system can rapidly and automatically generate the appropriate firewall rules to ensure protection of new resources provisioned into the server groups defined in the application profile and update the rules when resources are removed from the server groups defined in the application profile.

In other words, the application profile can be considered as a relatively static document through which various server groups and computing flows involving the server groups are defined. The relationships between the server groups typically do not change. What can change, however, are the resources (e.g., virtual machines) provisioned into the server groups during production. The system, by using the computing flows identified in the application profile and receiving or obtaining the IP addresses of machines when they are provisioned into the server groups, can automatically generate the appropriate firewall rules for the newly added machines.

In a specific implementation, the firewall rule generator obtains the IP address of the provisioned virtual machines via an agent or software daemon that is installed on the virtual machine during the provisioning process. The agent is configured to send the generator a message including an identifier (e.g., IP address) that is assigned to the virtual machine. The message may include a tag, flag, or other piece of information that identifies the server group or computing tier that the virtual machine has been provisioned into. In another specific implementation, the system may obtain the identifier (e.g., IP address) by requesting the identifier from the cloud services provider. For example, the system may make a call to an API provided by the cloud services provider in order to request the identifier.

The firewall rules may be generated for virtual machines of a server group included in the cloud chamber. Firewall rules may be generated for virtual machines of a computing tier included in the cloud chamber. Firewall rules may be generated for components included in the cloud chamber. The process of generating the firewall rules relies upon the identifiers assigned to the virtual machines during the provisioning process. In a specific implementation, the identifiers include the IP addresses assigned to the virtual machines during the provisioning process. An identifier, however, can include any piece of information or unit of data that helps to identify a particular virtual machine, device, or component.

In an implementation, firewall rules are not generated for items not included in the cloud chamber. For example, as discussed above, the protection of some items specified in an application profile such as a database may be the responsibility of the cloud services provider. In this case, the item when provisioned may not include an operating system or other software modules required by the system. In this case, firewall rules will not be generated by the system for such items. If such an item is selected for inclusion in a cloud chamber, the system may generate an alert indicating that the item cannot be added to the cloud chamber.

In a specific implementation, the system upon receiving the application profile and an indication of the tiers or groups of the virtual machines to include in a cloud chamber analyzes the application profile and cloud chamber definition to generate a set of firewall rules according to the security policies of the enterprise. In a specific implementation, the firewall rules generator includes an XML parser or processor. The XML processor can translate the application profile and the cloud chamber definition into programmatic commands used to create the firewall rules.

In a specific implementation, both the cloud chamber definition and the application profile definition are needed or used to generate the firewall rules for all VMs in the cloud chamber. This is because the application profile defines all tier groups and the computing flows connecting them. The chamber definition then defines what tiers (or groups) or components are in the chamber. With both definitions together, when a VM is provisioned in the system, the system can find all "neighbors" for the VM and the involved computing flows to generate firewall rules explicitly.

In other words, the application profile defines the tiers or server groups along with other components and computing flows that connect them. The virtual machines are added or deleted later in production. The cloud chamber definition is also defined along with the definition of the application profile. In production, when VMs are added or deleted from the application profile, the system will automatically generate the firewall rules for all VMs based on the definition of application profile and cloud chamber.

In a specific implementation, a flow of generating the firewall rules for all servers and components is as follows. For each say server in each server group (or for each component), a process finds all its "neighbors" in the application profile that are connected to such a server or component via a computing flow. A firewall rule is created with a source and a destination IP lock (that allows such network traffic). Given an application profile, there is a limited amount of servers and components, and the process includes linearly reviewing all components to create firewall rules.

In a specific implementation, a method includes examining a cloud chamber and determining that a first server group, having been provisioned with a first virtual machine, was selected to be included in the cloud chamber, examining an application profile and determining that a second server group, having been provisioned with a second virtual machine, connects to the first server group, obtaining, receiving, or requesting an IP address assigned to the second virtual machine, and inserting, placing, adding, injecting, or including the IP address into a firewall rule for the first virtual machine to allow the first virtual machine to receive a connection from the second virtual machine.

In another specific implementation, a method includes examining a cloud chamber and determining that a first server group, having been provisioned with a first virtual machine, was selected to be included in the cloud chamber, examining an application profile and determining that the first server group connects to a second server group, the second server group having been provisioned with a second virtual machine, obtaining an IP address assigned to the second virtual machine, and inserting the IP address into a firewall rule for the first virtual machine to allow the first virtual machine to initiate connections to the second virtual machine.

As discussed above, the computing flow is part of the application profile, which defines how the "application" will work. The application profile typically defines all "legal" computing flows (e.g., a white list). In this regard, when a computing flow is not defined in the application profile, the firewall rule will not allow this traffic. In other words, when a connection is received at a virtual machine in the cloud chamber, the connection data is compared to a firewall rule. If the connection data matches the rule the connection may be allowed. If the connection data does not match the rule the connection may be blocked. The connection data can include, for example, the source IP address of the object that is requesting the connection. In this example, the virtual machine represents the destination of the connection. This firewall rule is an example of a firewall rule that secures incoming network traffic.

As another example, when a virtual machine in the cloud chamber attempts to make a connection to a destination object, the connection data is compared to a firewall rule. If the connection data matches the rule the connection may be allowed. If the connection data does not match the rule the connection may be blocked. The connection data can include, for example, the destination IP address of the object that the virtual machine is attempting to connect with. In this example, the virtual machine represents the source of the connection. This firewall rule is an example of a firewall rule that secures outgoing network traffic.

Consider, as another example, a scenario where a cloud chamber is defined to include two tiers (or groups) of servers. A computing flow in an application profile specifies that the tier1 can initiate a TCP with port 5000 connecting to tier2. When the operations start, the administrator starts to lease virtual machines. The administrator places VM1 and VM2 into tier1 and VM3 and VM4 into tier2. Now, based on the definition of application profile, VM3 and VM4 are the "neighbors" to VM1. VM3 and VM4 are also "neighbors" to VM2. Assume tier1 is "silo." Then, VM2 is not the neighbor to VM1. Assume tier2 is "connected." Then VM1, VM2, VM4 are all "neighbors" to VM3. VM1, VM2, and VM3 are "neighbors" to VM4.

In a specific implementation, this "neighbor" relationship only starts to happen in the operations (i.e., the provisioning of VM happens in the operations phase, and not in the phase of creating the definition of application profile, computing flow, and cloud chamber definition).

In a specific implementation, generating firewall rules includes examining a first computing flow specified in the application profile, determining from the examination that the virtual machines provisioned into the first server group receive data from the virtual machines provisioned into the second server group, receiving from an agent installed on a virtual machine in the second server group a message including an IP address assigned to the virtual machine in the second server group, and generating a firewall rule for each virtual machine in the first server groups included in the cloud chamber. The first firewall rule includes the IP address assigned to the virtual machine provisioned into the second server group to allow the virtual machines in the cloud chamber to receive data from the virtual machine provisioned into the second server group.

In another specific implementation, generating firewall rules includes examining a first computing flow specified in the application profile, determining from the examination that the virtual machines provisioned into the first server group send data to the virtual machines provisioned into the second server group, receiving from an agent installed on a virtual machine in the second server group a message including an IP address assigned to the virtual machine in the second server group, and generating a firewall rule for each virtual machine in the first server group included in the cloud chamber. The first firewall rule includes the IP address assigned to the virtual machine provisioned into the second server group to allow the virtual machines in the cloud chamber to send data to the virtual machine provisioned into the second server group. The agents may be software components, modules, or daemons that are installed on the virtual machines during the provisioning of the virtual machines. See U.S. patent application Ser. No. 14/187,091 for an additional discussion of agents.

The computing flows specified in an application profile are converted or translated into firewall rules. In a specific implementation, the system provides for the authoring of additional or separate security policies that can be attached to the application profile for the generation of additional firewall rules and actions when the rules are or are not satisfied. These additional firewall rules can augment or supplement the actions to be applied when particular connections are made.

For example, the application profile may specify a computing flow is from a first server group to a component (or other server group). A firewall rule may then be created that allows data to be sent from the first server group to the component. There can, however, be a separate security policy that specifies certain actions to be applied when the firewall rule is (or is not) satisfied.

The policy may specify that the connection to the component be logged. It may be desirable, to log information about such connections to the component if, for example, the component is associated with a critical subnet or resource (e.g., corporate research and development). The log information can include, for example, a timestamp associated with the connection, a user name associated with the connection, signatures, and other connection details. The log can then be reviewed for patterns of suspicious activity and behavior. Instead or additionally, the log may be reviewed to help optimize the performance of the application. An action to apply can include logging the connection, generating an alert, directing or forwarding the connection to a quarantine area or security server for monitoring, or combinations of these.

In a specific embodiment, there are first, second, and third types of computing flows. The first type of computing flow is allowed and may be referred to as a regular, normal, or typical computing flow that may be defined in the application profile.

The second type of computing flow is allowed and may be referred to as a security computing flow. For the security computing flow the traffic may be allowed, but may be routed to a different server group (e.g., security server group) for monitoring behavior and capturing signatures. The security computing flow may be defined in a security policy that is separate from the application profile.

The third type of computing flow may be referred to as a blocking flow. Traffic matching or corresponding to the blocking flow may be blocked from reaching a particular destination. Actions can be applied when traffic matching a blocking flow is detected. Such actions can include, for example, alerts and logging of the attempted connections or locking the source server in a quarantine area for security screening. These actions can be specified in a security policy separate from the application profile.

Different cloud service providers may have different requirements on how an application profile is to be structured. For example, the syntax requirements for AWS (Amazon Web Services) may be different from the syntax requirements for Microsoft Azure. So, the XML processor may include different processing templates that correspond to the different requirements of various cloud service providers. In a specific implementation, the system can inspect an application profile and automatically determine and select the appropriate processing template. In another specific implementation, the administrator may provide a manual indication to the system of the appropriate template for processing the application profile.

In a step 830, the system distributes the firewall rules to the virtual machines in the cloud chambers. The firewall rules can be transmitted to each virtual machine in the server group or computing tier or compatible component selected to be included in the cloud chamber. In a specific implementation, firewall rules are distributed to each virtual machine within a cloud chamber. This allows a virtual machine to filter network traffic at the virtual machine. In other words, network traffic is filtered at a particular virtual machine rather than at a central location. Bottlenecking is reduced since traffic is not routed to or from a central location.

Figure 10:
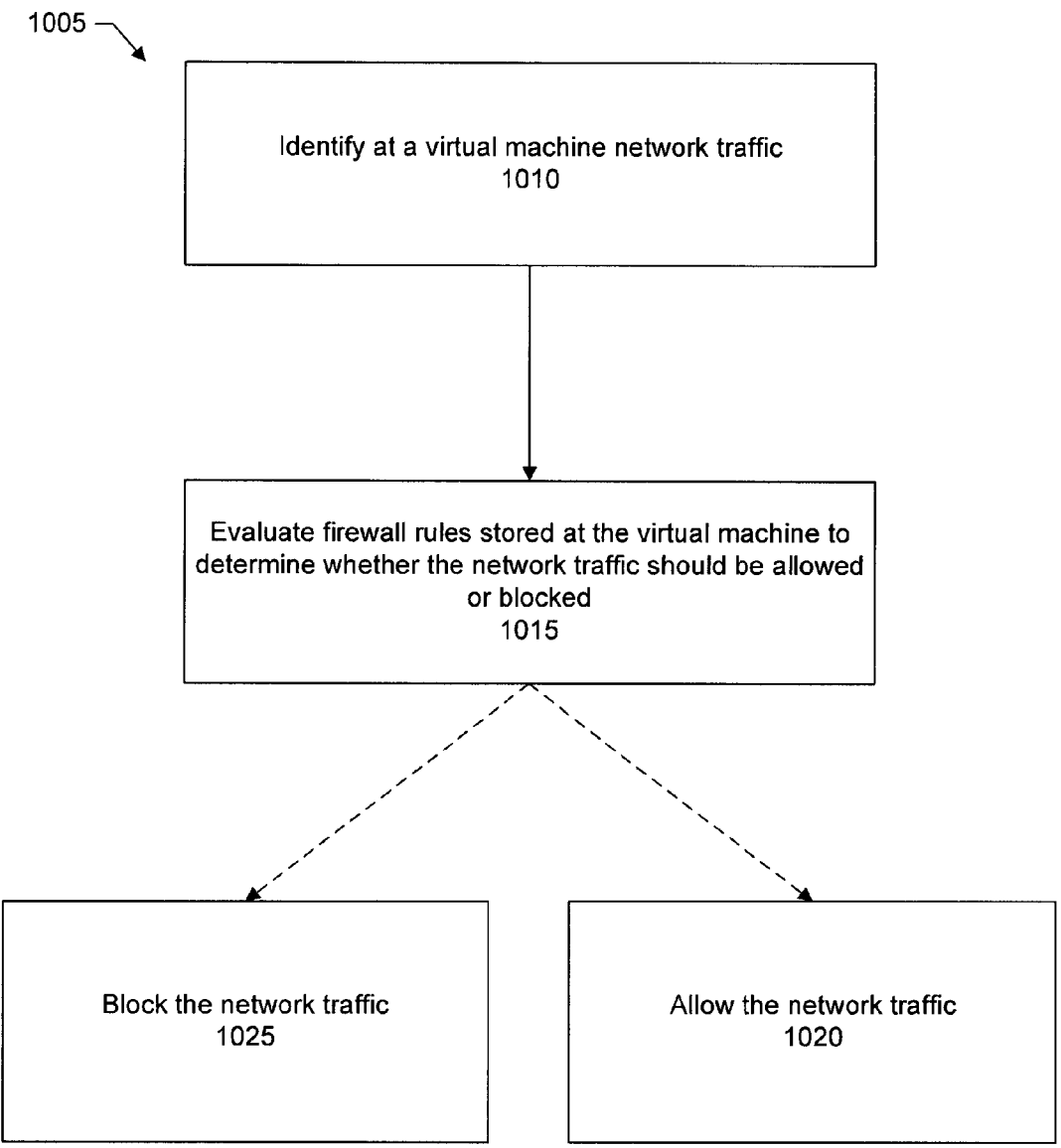
FIG. 10 shows a flow diagram for enforcing firewall rules at a virtual machine in a cloud chamber.

More particularly, as shown in FIG. 7 and discussed above, a firewall enforcer at a virtual machine is responsible for enforcing the firewall rules that have been distributed to the virtual machine. FIG. 10 shows an example of a flow 1005 for firewall enforcement at a virtual machine. In a step 1010, network traffic (e.g., a data packet or connection) is identified at a virtual machine. The network traffic can be inbound traffic, i.e., data sent to the virtual machine. The network traffic can be outbound traffic, i.e., data sent from the virtual machine.

In a step 1015, the firewall enforcer at the virtual machine evaluates one or more firewall rules stored at the virtual machine to determine whether the network traffic should be allowed (step 1020) or blocked (step 1025). A firewall rule may be formatted or structured as <source> <destination> <action>. The source field includes information identifying the source of a data packet. The destination field includes information identifying the destination of the data packet. The identifying information can include an IP address. That is, the source field can include the address of the host from which the packet originated. The destination field can include the address of the host the packet is attempting to reach. The action field specifies the action (e.g., allow or block) that the enforcer is to perform when there is a match on the source and destination.

A firewall rule may specify criteria such as the network or transport protocol being used to communicate between the source and destination hosts (e.g., Transmission Control Protocol (TCP), User Datagram Protocol (UDP), or Internet Control Message Protocol (ICMP)), characteristics of the transport layer communications session source and destination ports (e.g., TCP 80 for a destination port belonging to a web server, TCP 1320 for a source port belonging to a personal computer accessing the server), the interface being traversed by the packet, the direction of the packet, or combinations of these.

Firewall rules may be evaluated sequentially by the firewall enforcer. For example, the enforcer may compare information in a data packet to a first rule. If the information matches criteria in the first rule, the enforcer applies an action specified in the first rule. If the information does not match the criteria, the enforcer selects a second rule that is ordered after the first rule.

It should be appreciated that there can be many different types of firewall rules to help protect the enterprise from malware, internal attacks, inadvertent configurations, spoofing, data theft, and so forth. Firewall rules can be used to allow only specific traffic in and out of a cloud chamber or virtual machine within a cloud chamber. Firewall rules can be used to allow only specific traffic to and from a cloud chamber or virtual machine within a cloud chamber.

Depending on factors such as the information in the application profile, the cloud chamber definition, security policies, or combinations of these, firewall rules can be defined such that all or specific types of network traffic are blocked or allowed across a cloud chamber boundary. Firewall rules can be defined such that two or more computing resources (e.g., virtual machines) in a tier or a server group are not allowed to communicate with each other. This type of tier or group of cloud chamber may be referred to as a "silo" server group. Firewall rules can be defined such that two or more computing resources (e.g., virtual machines) in a tier or server group are allowed to communicate with each other. This type of tier or server group may be referred to as a "connected" server group. "Silo" and "connected" can be properties that apply to a server group or tier. A cloud chamber can include several tiers or groups. Computing flows can be defined to address how they can (or cannot) communicate with each other.

Communications between virtual machines in a cloud chamber or virtual machines across two cloud chambers may be restricted, according to the firewall rules, to all or specific types of communications. A set of firewall rules distributed to a virtual machine in a cloud chamber may be different from or the same as a set of firewall rules distributed to another virtual machine in the same cloud chamber. A set of firewall rules distributed to a virtual machine in a cloud chamber may be different from or the same as a set of firewall rules distributed to another virtual machine in a different cloud chamber.

In a specific implementation, the firewall enforcer operates at an operating system level. For example, the firewall enforcer may be in a guest operating system of the virtual machine. The firewall enforcer may be in a host operating system of a physical machine that is hosting the virtual machine. The firewall enforcer may be embedded in an application program. The firewall enforcer may be implemented as an add-in, plug-in, script, macro, library, extension program, filter, or device driver.

In addition to blocking or allowing network traffic, the enforcer may perform other actions in accordance with a cloud firewall when conditions of the firewall rule have (or have not) been satisfied. Such actions can include logging or recording information about the connections in a log, generating alerts, and so forth.

Figure 11:
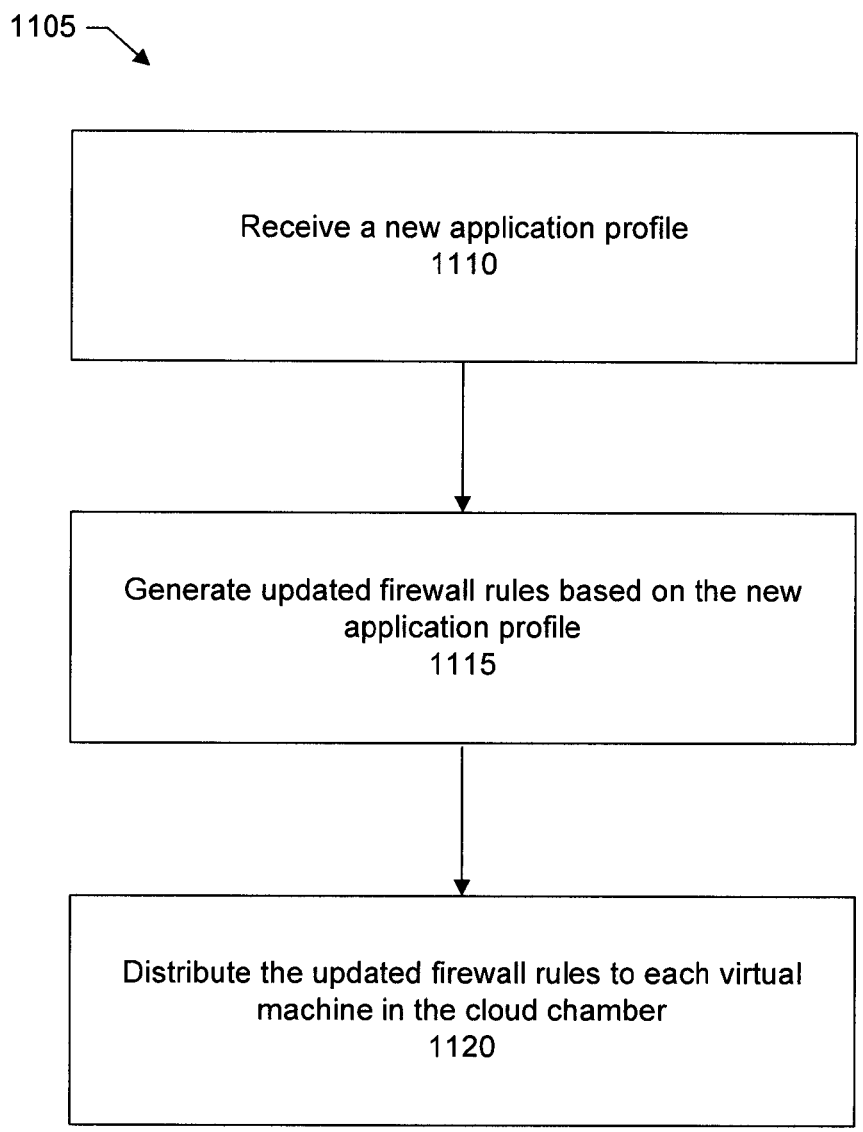
FIG. 11 shows a flow diagram for updating firewall rules for a cloud chamber.

FIG. 11 shows a flow 1105 for updating firewall rules of a cloud firewall. In a step 1110, the system receives a new application profile. The new application profile may include a change in configuration, settings, dependencies, computing flows, deployment requirements, or combinations of these, with respect to the existing or previously received application profile. For example, a new application profile may add a new virtual machine to the environment, delete an existing virtual machine from the environment, add a new server group, add a new computing tier, add a new component, add a new computing flow, modify, change, or alter an existing computing flow, delete an existing server group, delete an existing computing tier, delete an existing component, delete an existing computing flow, or combinations of these.

In a step 1115, the system generates updated firewall rules based on the new application profile. In a specific implementation, a flow for firewall rule updates when adding or deleting a virtual machine in the application profile is as follows. When a virtual machine is added to a server group in an application profile, all neighbors for this new member can be found from the data structure. The system generates the firewall rules for this new virtual machine. The firewall rules for all neighbors can be updated as well. Likewise, a similar method applies to the deletion of a virtual machine in the profile.

Typically, the other components in the application profile are not changing as frequently as the virtual machines. However, the same method for updating firewall rules applies to those components if changed.

In a step 1120, the system distributes the updated firewall rules as needed to each virtual machine in the cloud chamber.

As can be appreciated, there are many aspects and embodiments of the invention. Presented below in example claim format are various embodiments and aspects of the invention.

1. A method comprising:
receiving user input comprising an application profile for an application, the application profile specifying a first server group, a second server group, and a computing flow between the first and second server groups, the specified first and second server groups being empty groups without virtual machines having been provisioned into the first and second server groups;
receiving user input comprising a selection of at least the first server group to include in a cloud chamber;
examining the computing flow in the application profile and determining that a direction of the flow is from the first server group to the second server group;
after virtual machines have been provisioned into the first and second server groups, the first and second server groups now having virtual machines, obtaining an Internet Protocol (IP) address assigned to each virtual machine provisioned into the second server group;
inserting an IP address assigned to a virtual machine provisioned into the second server group into a firewall rule for a virtual machine provisioned into the first server group; and
distributing the firewall rule to the virtual machine provisioned into the first server group.

2. The method of claim 1 wherein the computing flow in the application profile includes an attribute indicating the computing flow as being legal or illegal.

3. The method of claim 1 comprising:
storing a security policy, separate from the application profile, the security policy specifying one or more actions to be applied when illegal computing flows are detected;
determining that the computing flow is an illegal computing flow; and
inserting into the firewall rule the one or more actions to be applied.

4. The method of claim 3 wherein the one or more actions comprises an action to block the illegal computing flow.

5. The method of claim 3 wherein the one or more actions comprises a first action to allow the illegal computing flow, and a second action to log the illegal computing flow.

6. The method of claim 1 comprising:

storing a security policy, separate from the application profile, the security policy specifying one or more actions to be applied when a connection matching the computing flow is detected; and providing the one or more actions to a firewall enforcer at the virtual machine provisioned into the first server group.

7. The method of claim 1 wherein the application profile specifies a component having an IP address, the component being provided by a cloud services provider, a computing flow is between the first server group and the component, and the method comprises:

inserting the IP address of the component into a second firewall rule for the virtual machine provisioned into the first server group.

8. The method of claim 1 comprising:

after the distributing the firewall rule, receiving an indication that a new virtual machine has been provisioned into the second server group;

reexamining the computing flow and determining that a direction of the flow is from the first server group to the second server group;

obtaining an IP address assigned to the new virtual machine provisioned into the second server group;

inserting the IP address assigned to the new virtual machine into a second firewall rule for the virtual machine provisioned into the first server group; and distributing the second firewall rule to the virtual machine provisioned into the first server group.

9. The method of claim 1 comprising:

after the distributing the firewall rule, receiving an indication that a virtual machine has been removed from the second server group;

updating a firewall rule distributed to the virtual machine provisioned into the first server group to delete a reference to the virtual machine removed from the second server group; and distributing the updated firewall rule to the virtual machine provisioned into the first server group.

10. A method comprising:

receiving user input comprising an application profile for an application, the application profile specifying a plurality of server groups, and a plurality of computing flows involving the server groups, the specified server groups being empty groups without virtual machines having been provisioned into the groups;

receiving user input comprising a selection of at least a first server group to include in a cloud chamber;

examining a first computing flow in the application profile;

determining that a direction of the first computing flow is from the first server group to the second server group;

determining that a type of the first computing flow is allowed;

after virtual machines have been provisioned into the server groups, the server groups now having virtual machines, obtaining an Internet Protocol (IP) address assigned to each virtual machine provisioned into the second server group;

inserting an IP address assigned to a virtual machine provisioned into the second server group into a first firewall rule for a virtual machine provisioned into the first server group to indicate that the virtual machine provisioned into the second server group is an allowed destination;

examining a second computing flow in the application profile;

determining that a direction of the second computing flow is from the first server group to a third server group;

determining that a type of the second computing flow is blocked;

after virtual machines have been provisioned into the server groups, the server groups now having virtual machines, obtaining an IP address assigned to each virtual machine provisioned into the third server group; and inserting an IP address assigned to a virtual machine provisioned into the third server group into a second firewall rule for the virtual machine provisioned into the first server group to indicate that the virtual machine provisioned into the third server group is a blocked destination.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment.

What is claimed is:

1. A method comprising:

receiving user input comprising an application profile for deployment of an application in a cloud-computing environment, the application profile specifying a first server group, a second server group, and a computing flow between the first and second server groups;

receiving user input identifying at least one of the first or second server groups to include in a cloud chamber;

obtaining Internet Protocol (IP) addresses assigned to virtual machines provisioned into the first and second server groups;

based on the computing flow specified in the application profile and the IP addresses assigned to the virtual machines, generating a plurality of firewall rules for each virtual machine in the at least one first or second server groups included in the cloud chamber; and distributing the firewall rules to each virtual machine in the at least one first or second server groups included in the cloud chamber.

2. The method of claim 1 wherein a first firewall rule distributed to a virtual machine in the cloud chamber comprises an IP address assigned to another virtual machine to indicate that the virtual machine is allowed to receive communications from the other virtual machine.

3. The method of claim 1 wherein a first firewall rule distributed to a virtual machine in the cloud chamber comprises an IP address assigned to another virtual machine to indicate that the virtual machine is allowed to send communications to the other virtual machine.

4. The method of claim 1 wherein the first server group is included in the cloud chamber, the second server group is not included in the cloud chamber, and the method comprises:

not generating the firewall rules for the virtual machines of the second server group not included in the cloud chamber.

5. The method of claim 1 wherein the generating a plurality of firewall rules comprises:

examining the computing flow specified in the application profile;

determining from the examination that the virtual machines provisioned into the first server group send data to the virtual machines provisioned into the second server group;

obtaining an IP address assigned to a virtual machine provisioned into the second server group; and generating a first firewall rule for each virtual machine in the at least one first or second server groups included in the cloud chamber, wherein the first firewall rule comprises the IP address assigned to the virtual machine provisioned into the second server group to allow the virtual machines in the cloud chamber to send data to the virtual machine provisioned into the second server group.

6. The method of claim 1 wherein the generating a plurality of firewall rules comprises:

examining the computing flow specified in the application profile;

determining from the examination that the virtual machines provisioned into the first server group receive data from the virtual machines provisioned into the second server group;

receiving from an agent installed on a virtual machine in the second server group a message comprising an IP address assigned to the virtual machine in the second server group; and generating a first firewall rule for each virtual machine in the at least one first or second server groups included in the cloud chamber, wherein the first firewall rule comprises the IP address assigned to the virtual machine provisioned into the second server group to allow the virtual machines in the cloud chamber to receive data from the virtual machine provisioned into the second server group.

7. The method of claim 1 wherein the generating a plurality of firewall rules is after the obtaining IP addresses.

8. A method comprising:

receiving information about an application for deployment of the application in a cloud-computing environment, the information specifying a first server group, a second server group, and a computing flow between the first and second server groups;

receiving a selection of at least the first server group to include in a cloud chamber;

obtaining Internet Protocol (IP) addresses assigned to virtual machines that have been provisioned into the first and second server groups;

based on the computing flow and the IP addresses assigned to the virtual machines, generating a plurality of firewall rules for each virtual machine in the first server group included in the cloud chamber; and transmitting the firewall rules to each virtual machine in the first server group included in the cloud chamber.

9. The method of claim 8 wherein when receiving the information, no virtual machines have been provisioned into the first and second server groups.

10. The method of claim 8 wherein the computing flow indicates a direction of network traffic from one of the first or second server groups to another of the first or second server groups.

11. The method of claim 8 wherein the generating firewall rules comprises:

identifying a first virtual machine that has been provisioned into the first server group included in the cloud chamber;

examining the information and determining that the second server group, having been provisioned with a second virtual machine, connects to the first server group;

obtaining an IP address assigned to the second virtual machine; and inserting the IP address into a firewall rule for the first virtual machine to allow the first virtual machine to receive connections from the second virtual machine.

12. The method of claim 8 wherein the generating firewall rules comprises:

identifying a first virtual machine that has been provisioned into the first server group included in the cloud chamber;

examining the information and determining that the first server group connects to the second server group, the second server group having been provisioned with a second virtual machine;

obtaining an IP address assigned to the second virtual machine; and inserting the IP address into a firewall rule for the first virtual machine to allow the first virtual machine to connect to the second virtual machine.

13. The method of claim 8 comprising:

determining from the received information that virtual machines provisioned into the first server group send data to virtual machines provisioned into the second server group;

obtaining an IP address of a virtual machine in the second server group; and generating for each virtual machine in the first server group a first firewall rule comprising the IP address of the virtual machine in the second server group to allow each virtual machine in the first server group to send data to the virtual machine in the second server group.

14. The method of claim 8 wherein the generating a plurality of firewall rules comprises:

examining the computing flow specified in the information;

determining from the examination that the virtual machines provisioned into the first server group receive data from the virtual machines provisioned into the second server group;

receiving from an agent installed on a virtual machine in the second server group a message comprising an IP address assigned to the virtual machine in the second server group; and generating a first firewall rule for each virtual machine in the at least first server group included in the cloud chamber, wherein the first firewall rule comprises the IP address assigned to the virtual machine provisioned into the second server group to allow the virtual machines in the cloud chamber to receive data from the virtual machine provisioned into the second server group.

15. A method comprising:

receiving user input comprising an application profile for an application, the application profile specifying a plurality of computing tiers, a plurality of computing components, and a plurality of computing flows involving the computing tiers and components;

receiving user input identifying at least a first computing tier to include in a cloud chamber;

examining a first computing flow specified in the application profile to determine that virtual machines provisioned into the first computing tier receive data from virtual machines provisioned into a second computing tier;

obtaining an Internet Protocol (IP) address assigned to a virtual machine provisioned into the second computing tier; and generating a first firewall rule for a virtual machine provisioned into the first computing tier included in the cloud chamber, wherein the first firewall rule comprises the IP address assigned to the virtual machine provisioned into the second computing tier to identify the virtual machine in the second computing tier as being an allowed source of data.

16. The method of claim 15 wherein the obtaining an IP address assigned to a virtual machine provisioned into the second computing tier comprises:

after the virtual machine has been provisioned into the second computing tier, receiving from an agent installed on the virtual machine in the second computing tier a message comprising the IP address assigned to the virtual machine in the second computing tier.

17. The method of claim 15 comprising:

examining a second computing flow specified in the application profile to determine that virtual machines provisioned into the second computing tier send data to virtual machines provisioned into a third computing tier;

obtaining an IP address of a virtual machine provisioned into the third computing tier; and generating a second firewall rule for the virtual machine provisioned into the second computing tier included in the cloud chamber, wherein the second firewall rule comprises the IP address assigned to the virtual machine provisioned into the third computing tier to identify the virtual machine in the third computing tier as being an allowed destination of data.

18. The method of claim 15 comprising:

examining a second computing flow specified in the application profile to determine that virtual machines provisioned into the first computing tier send data to a first component, the first component being provided by a cloud services provider for the application;

obtaining an IP address assigned to the first component; and generating a second firewall rule for the virtual machine provisioned into the first computing tier included in the cloud chamber, wherein the second firewall rule comprises the IP address assigned to the first component to identify the first component as being an allowed destination of data.

19. The method of claim 18 wherein the first component comprises a database.

20. The method of claim 15 comprising:

distributing the first firewall rule to each virtual machine provisioned into the first computing tier included in the cloud chamber.

* * * * *